US 7,487,522 B2
Feb. 3, 2009

(12) United States Patent
Oishi

(10) Patent No.: US 7,487,522 B2
(45) Date of Patent: Feb. 3, 2009

(54) APPARATUS FOR OPENING AND CLOSING A HEAD OPENING, AND DISK CARTRIDGE USING THE SAME

(75) Inventor: Kengo Oishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 383 days.

(21) Appl. No.: 11/077,009

(22) Filed: Mar. 11, 2005

(65) Prior Publication Data

US 2005/0204377 A1 Sep. 15, 2005

(30) Foreign Application Priority Data

Mar. 11, 2004 (JP) ............................. 2004-068948
Mar. 15, 2004 (JP) ............................. 2004-073269

(51) Int. Cl.
*G11B 23/03* (2006.01)

(52) U.S. Cl. ..................................................... 720/741

(58) Field of Classification Search ................... 720/741
See application file for complete search history.

(56) References Cited

U.S. PATENT DOCUMENTS

2004/0205809 A1* 10/2004 Saji et al. .................... 720/741
2004/0210921 A1* 10/2004 Shibagaki et al. ........... 720/741
2004/0255319 A1* 12/2004 Inoue et al. .................. 720/741
2005/0076356 A1* 4/2005 Yamada et al. .............. 720/726
2005/0091677 A1* 4/2005 Imai ............................ 720/741
2005/0160447 A1* 7/2005 Iwaki et al. .................. 720/741
2005/0273801 A1* 12/2005 Funawatari et al. ......... 720/741

FOREIGN PATENT DOCUMENTS

| JP | 2002-269944 A | 9/2002 |
| JP | 2003-115184 A | 4/2003 |
| JP | 2003-242740 A | 8/2003 |
| WO | 03/079356 | 9/2003 |

* cited by examiner

*Primary Examiner*—David D Davis
(74) *Attorney, Agent, or Firm*—Sughrue Mion, PLLC

(57) ABSTRACT

A disk cartridge capable of smoothly opening/closing a head opening without enlarging a second shutter. In a disk cartridge, a disc-shaped disk medium is rotatably housed in a disk housing portion of a case, and a head opening through which a head of a drive device accesses a recording face is formed in the bottom plate of the case. The head opening is closed when an end of a first shutter, which is rotatable coaxially with the disk medium and an end of a second shutter swingable around an axis different from that of the first shutter come into contact with each other. Each of the contact ends of the first and second shutters includes an arc portion having the axis of turn of the second shutter as a center.

16 Claims, 18 Drawing Sheets

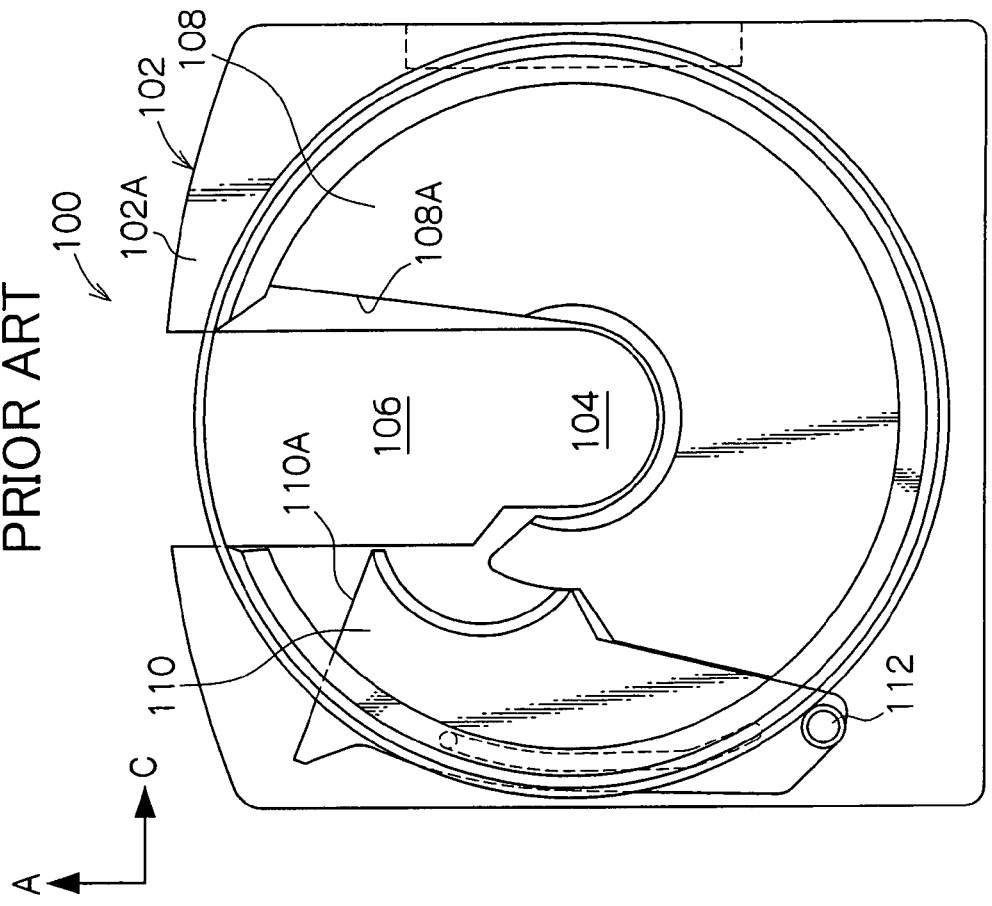
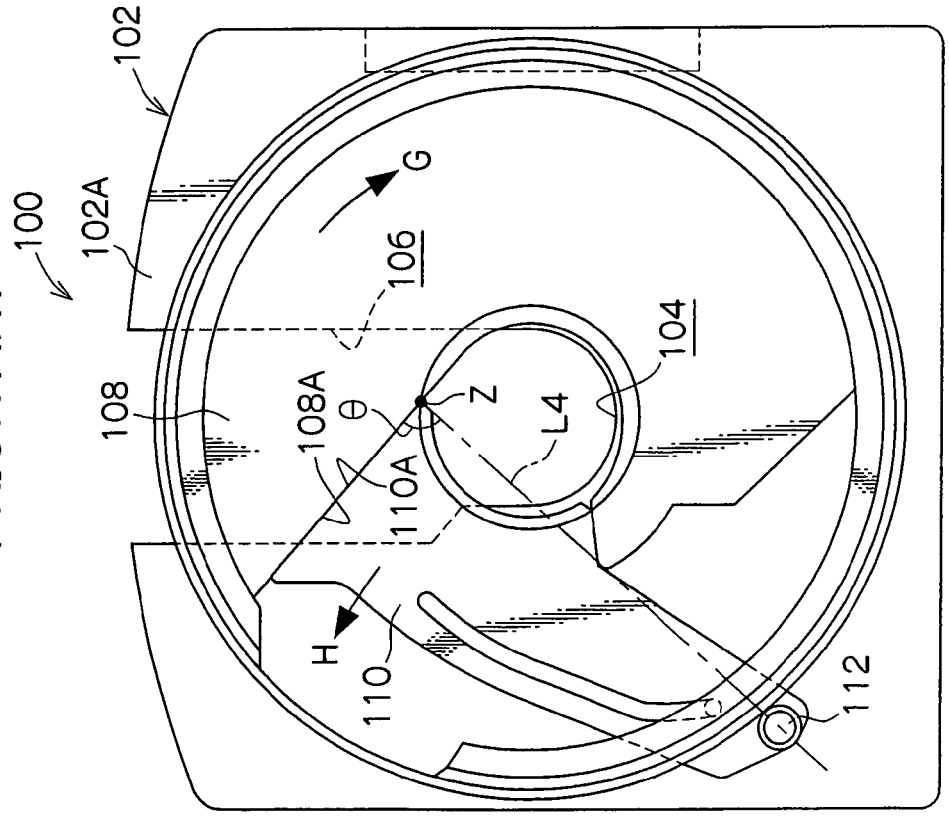

APPARATUS FOR OPENING AND CLOSING A HEAD OPENING, AND DISK CARTRIDGE USING THE SAME

CROSS-REFERENCE TO RELATED APPLICATION

This application claims priority under 35 USC 119 from Japanese Patent Applications Nos. 2004-068948 and 2004-073269, the disclosures of which are incorporated by reference herein.

BACKGROUND OF THE INVENTION

1. Field of the Invention

The present invention relates to a disk cartridge in which a disc-shaped disk medium used as a medium to/from which information and a video image is recorded/reproduced is rotatably housed in a case.

2. Description of the Related Art

As a recording/reproducing medium for a portable computer and a recording/reproducing medium of a video image, for example, disc-shaped disk media such as an optical disk and a magnet optical disk are used. At the time of recording or reproduction, while being rotated by a spindle shaft in a state where such a disk medium is loaded on a disk drive device, a recording layer of the disk medium is irradiated with a laser beam or both a laser beam and a magnetic field by a recording head accessing a recording face side of the disk medium. With the configuration, in the disk medium, information is recorded by decomposition of the recording layer and/or formation of a pit, a phase change, a magnetization inversion or the like by a temperature rise, or recorded information is reproduced with a reproducing head by reading variations in the reflectance of a laser beam or a polarization angle.

There is a known disk cartridge in which a disk medium is housed in a housing part of a case in order to prevent adhesion of dusts and the like onto the recording layer in the disk medium as the recording capacity of the disk medium increases (refer to, for example, Japanese Patent Application Laid-Open (JP-A) No. 2003-115184). In such a disk cartridge, a chucking opening and a head opening for accessing a center hole in the disk medium and the recording layer side are formed on the recording layer side of the disk medium in the case. The openings are closed by a pair of shutters driven by an inner rotor.

There is another known disk cartridge having an opening through which a disk medium can be inserted/ejected on the side opposite to the chucking opening and the head opening for the disk medium in the case (for example, refer to JP-A No. 2003-242740). In the disk cartridge, the openings are provided and a pair of shutters and also the inner rotor is operated in the same plane, thereby reducing the thickness. The shutter mechanism of the disk cartridge will be described with reference to FIGS. 18A and 18B.

A disk cartridge 100 shown in FIGS. 18A and 18B has, in a bottom plate 102A of a case 102, a chucking opening 104 for accessing the center hole in a disk medium (not shown in figure) and a head opening 106 through which the head of a drive device accesses a recording face. Between a disk medium in the case 102 and the bottom plate 102A, a first shutter 108 turnable coaxially with the disk medium and a second shutter 110 having a swing shaft 112 on the outside in the radial direction of the disk medium in the case 102 are provided.

A contact end face 108A of the first shutter 108 and a contact end face 110A of the second shutter 110, as ends which come into contact with each other as shown in FIG. 18A are allowed to come into contact with each other to close the head opening 106, and the chucking opening 104 is always maintained in an open state. By turning the first shutter 108 in the direction of the arrow G and turning the second shutter 110 in the direction of the arrow H which is almost opposite to the arrow G with respect to the head opening 106, as shown in FIG. 18B, the head opening 106 is opened.

The contact end faces 108A and 110A of the first shutter 108 and the second shutter 110 have straight lines. In the disk cartridge 100, the contact end face 110A is moved apart from/close to the contact end face 108A while drawing a locus of relative movement at an acute angle with respect to the contact end face 108A. Consequently, when the angle $\theta$ formed between a straight line L4 (refer to FIG. 18A) connecting the axis of the swing shaft 112 of the second shutter 110 and an end Z at the head side in the closing direction in the contact end face 110A and the contact end face 110A is an acute angle, in a state where the head opening 106 is closed, the second shutter 110 cannot move in the direction of the arrow H until the first shutter 108 is turned in the direction of the arrow G more than a predetermined distance.

In the configuration disclosed in JP-A No. 2003-242740, the angle $\theta$ is set as an obtuse angle. Consequently, in a state where the head opening 106 is open as shown in FIG. 18B, the contact end face 108A of the first shutter 108 is inclined in the direction of opening wider from an edge 106A of the head opening 106 so as to be in a position further turned to the arrow G side more than the right-side edge 106A which is parallel to a loading direction A to the drive device of the head opening 106. In other words, a notch in the first shutter 108 is formed larger than the head opening 106, and the second shutter 110 becomes larger by the amount of enlarging the notch of the first shutter 108. Therefore, in the conventional disk cartridge 100, there is a case such that the second shutter 110 cannot be housed in the limited space in the case 102 in a state where the head opening 106 is open, that is, the head opening 106 having a predetermined size cannot be completely opened due to dimensional errors and assembly errors of the parts.

In the disk cartridge 100, the head opening 106 is closed by making the contact end faces 108A and 110A extending in the plate thickness direction of the first and second shutters 108 and 110 come into contact with each other. Consequently, there is the possibility that a gap is generated between the contact end faces 108A and 110A in a state where the head opening 106 is closed due to the dimensional errors and assembly errors of the first shutter 108 or second shutter 110. The gap causes invasion of dusts into the case 102, specifically, adhesion of dusts onto the recording face of a disk medium.

JP-A No. 2003-242740 discloses that the contact end faces 108A and 110A can be also formed as inclined faces, which match each other. With the configuration, even if a gap is created between the contact end faces 108A and 110A, invasion of dusts into the case 102 is suppressed. However, even with the configuration, a gap having a linear shape in cross sectional view along the inclined faces of the contact end faces 108A and 110A is created, so that the technique is not sufficient as a countermeasure against dusts.

On the other hand, Japanese Patent Laid-open No. 2003-115184 discloses a configuration that the end faces of a pair of shutters disposed between an inner rotor and the bottom plate of a case are in contact with each other and the pair of shutters overlap each other in the vertical direction. However, when the overlap structure is intended to be applied to the disk cartridge 100, the size of the second shutter 110 further increases, and it becomes difficult to completely open the head opening 106 having a required size. On the other hand, when a visor portion is extended from the contact end face 108A of the first shutter 108, the visor portion extends into the head opening in a state where the head opening 106 is open and, as a result, the head opening 106 cannot be perfectly opened. In addition, the head opening cannot be enlarged to permit an access of a large recording/reproduction head.

Further, a disk cartridge having another shutter mechanism for operating a pair of shutters in the same plane is also known (refer to, for example, JP-A No. 2002-269944). Although not shown in figure, in the configuration, the axis of turn of the second shutter is positioned on the right side whereas the swing shaft 112 of the second shutter of the above-described disk cartridge 100 is positioned on the left side of the drawing sheet, which is opposite to the above. Therefore, the contact end face of the second shutter is moved apart from/close to the contact end face of the first shutter while drawing the locus of relative movement at an obtuse angle. Consequently, in the conventional configuration, the operation of the second shutter does not interfere with the first shutter. In the configuration, however, the closed portion of the head opening by the second shutter and the axis of turn are far from each other, so that the second shutter becomes large (long). In addition, a cam mechanism for making the first and second shutters operate interlockingly has to be disposed near the axis of turn of the first shutter. A large force is necessary to open/close the head opening, and it is difficult to smoothly operate the first and second shutters.

SUMMARY OF THE INVENTION

An object of the present invention is to obtain a disk cartridge capable of smoothly opening/closing a head opening without enlarging a second shutter.

Another object of the invention is to obtain a disk cartridge in which the head opening can be closed/opened with reliability and which realizes improved dustproof performance in a state where the head opening is closed.

To achieve the object, according to one aspect of the invention, there is provided a disk cartridge comprising: a case having a housing portion for housing a disk medium formed in a disc shape so as to be rotatable, and a head opening which is provided on a recording face side of the disk medium in said housing portion and through which a head of a drive device accesses the recording face; and a shutter mechanism having a first shutter rotatably provided at the case so as to be coaxial with the disk medium and a second shutter swingable around an axis different from that of the first shutter, closing the head opening by ends of the first and second shutters coming into contact with each other, and opening the head opening by the first and second shutters rotating in directions opposite to each other with respect to the head opening, wherein each of the contact ends of the first and second shutters in a state where the head opening is closed includes an arc portion having the axis of rotation of the second shutter as a center.

According to another aspect of the invention, there is provided a disk cartridge comprising: a case having a housing portion for housing a disk medium formed in a disc shape so as to be rotatable, and a head opening which is provided on a recording face side of the disk medium in said housing portion and through which a head of a drive device accesses the recording face; and a shutter mechanism having a first shutter rotatably provided at the case so as to be coaxial with the disk medium and a second shutter swingable around an axis different from that of the first shutter, closing the head opening by ends of the first and second shutters coming into contact with each other, and opening the head opening by the first and second shutters rotating in directions opposite to each other with respect to the head opening, wherein the contact ends of the first and second shutters have contact end faces which come into contact with each other in a state where the head opening is closed, and overlap portions which overlap each other in the thickness direction in a state where the head opening is closed, and wherein at least one part in the longitudinal direction of each of the contact end faces of the first and second shutters is formed in an arc shape which extends along an arc having the axis of rotation of the second shutter as a center in a state where the head opening is closed so as to allow swinging of the second shutter in a state where the first shutter is in the position of closing the head opening.

Other objects, features and advantages of the invention will be apparent to those skilled in the art from the explanation of the preferred embodiment of the invention illustrated in the appended drawings, and from the appended claims.

BRIEF DESCRIPTION OF THE DRAWINGS

FIGS. 18A and 18B are diagrams showing a conventional disk cartridge. FIG. 18A is a plan view showing a state where the head opening is closed by the shutter mechanism and FIG. 18B is a plan view showing a state where the head opening is open by the shutter mechanism.

DETAILED DESCRIPTION OF THE INVENTION

A disk cartridge 10 according to a first embodiment of the present invention will be described with reference to FIGS. 1 to 6. The arrow A properly shown in the diagrams indicates the direction of loading the disk cartridge 10 into the drive device and, for convenience of explanation, the side shown by the arrow A indicative of the direction of loading to the drive device will be referred to as the front side. The direction indicated by the arrow B refers to the upper side, and the direction indicated by the arrow C refers to the right side.

Figure 1:
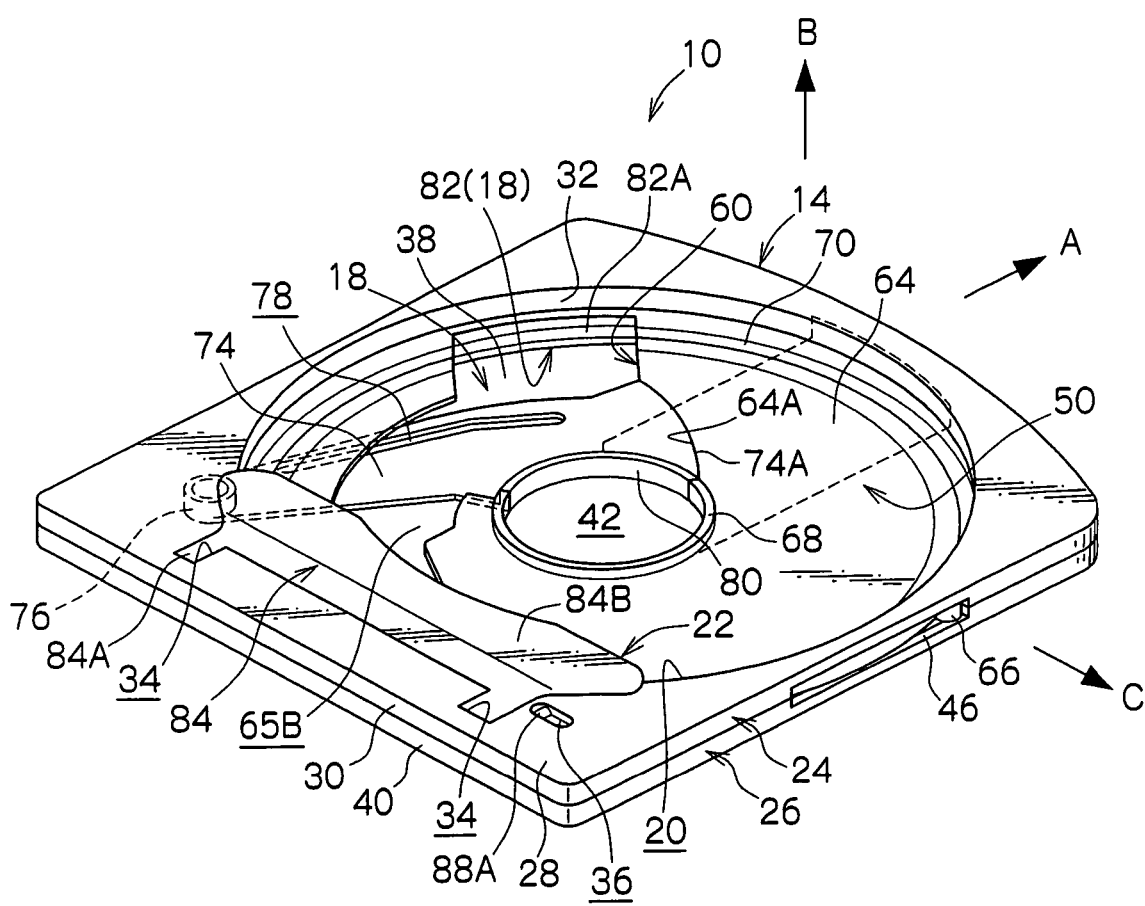
FIG. 1 is an oblique perspective view showing the appearance of a disk cartridge according to a first embodiment of the present invention.
Figure 2:
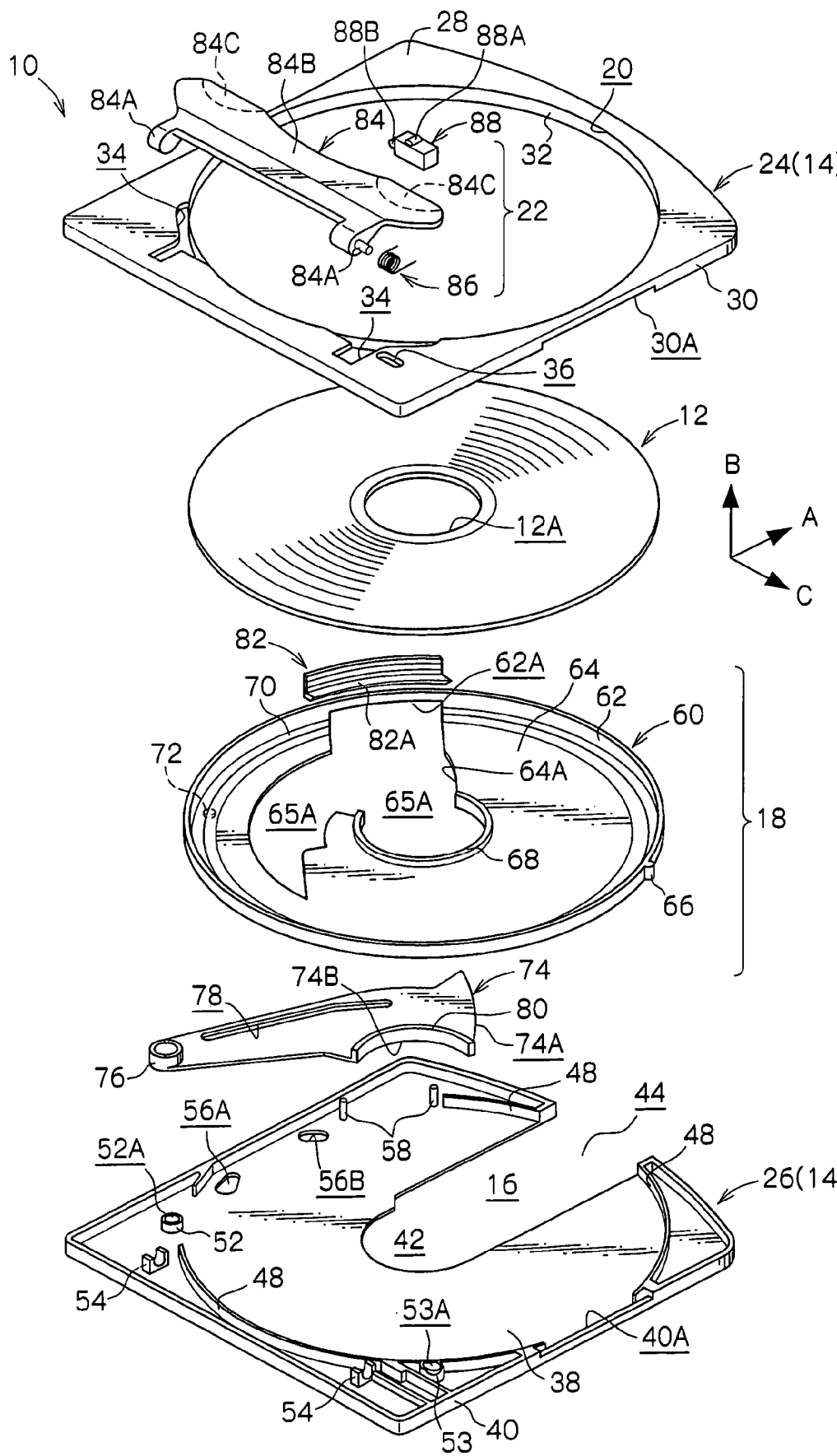
FIG. 2 is an exploded oblique perspective view of the disk cartridge according to the first embodiment of the invention.

FIG. 1 is an oblique perspective view showing the appearance of the disk cartridge 10. FIG. 2 is an exploded oblique perspective view of the disk cartridge 10. As shown in the diagrams, the disk cartridge 10 has, as main components, a case 14 in which a disk medium 12 as an information recording/reproducing medium formed in a disc shape is rotatably housed, a shutter mechanism 18 for opening/closing a head opening 16 which opens in the under face of the case 14 and through which a recording/reproducing head accesses a recording surface of the disk medium 12, and a disk holding mechanism 22 for preventing the disk medium 12 from coming off from a disk opening 20 which opens on the upper side of the case 14 and through which the disk medium 12 can be inserted/ejected to/from the case 14. In FIG. 1, the disk medium 12 is shown.

First, a schematic general configuration of the disk cartridge 10 will be described. After that, the detailed configuration of the shutter contact portion in the shutter mechanism 18 as a main part of the invention will be described.

General Configuration of Disk Cartridge

Configuration of Disk Medium

The disk medium 12 housed in the disk cartridge 10 is formed in a disc shape as described above. In the axis portion of the disk medium 12, a center hole 12A to which a rotary spindle shaft of a disk drive device is chucked (fit in) is provided. The under face as a recording face (not shown in figure) of the disk medium 12 is covered and protected with a cover layer (not shown in figure). The recording face is formed in an annular shape in a portion except for a portion around the outer periphery in the under face of the disk medium 12 and a predetermined range around the center hole 12A. The area is a recording area. The area between the periphery of the center hole 12A and the inner edge of the recording face in the under face of the disk medium 12 is a chucking area used by the rotary spindle shaft of the drive device to chuck the disk medium 12. In the embodiment, the diameter (outside diameter) of the disk medium 12 is about 120 mm.

Configuration of Case

The case 14 is constructed as a flat container having an almost rectangular shape in plan view by joining an upper shell 24 and a lower shell 26. Concretely, the front edge portion of the case 14 is formed in an arc shape, which is symmetrical with respect to the centerline and the rear end is formed as a straight line in the lateral direction in plan view. By the shape, erroneous loading to the drive device is prevented.

The upper shell 24 has a top plate 28 having a shape corresponding to the shape of the case 14 in plan view and an outer peripheral wall 30 vertically extended downward along the outer rim of the top plate 28. A disk opening 20 having an almost circular shape in plan view is provided in the top plate 28, and the inside diameter of the disk opening 20 is larger than the outside diameter of the disk medium 12. With the configuration, the disk medium 12 can be inserted/ejected to/from the case 14 through the disk opening 20. The upper shell 24 also has an annular-shaped inner peripheral wall 32 vertically extended downward along the rim of the disk opening 20.

In two portions at the rear end side of the top plate 28 and on the outside in the radial direction of the inner peripheral wall 32, notches 34 for attaching a disk pressing member 84 which will be described later are provided. Further, a lock operation window 36, which is long in the lateral direction for operating a locking member 88 to be described later, is provided on the right side of the right notch 34 in the top plate 28. On the other hand, a notch 30A, which is long in the longitudinal direction and has a U-shaped rim opening downward, is formed in the center portion in the longitudinal direction of a part of the right side wall of the case 14 in the outer peripheral wall 30.

The lower shell 26 includes a bottom plate 38 having a shape almost corresponding to the top plate 28 and an outer peripheral wall 40 having a shape almost corresponding to the outer peripheral wall 30. In the bottom plate 38, a chucking opening 42 having an almost circle shape corresponding to the center hole 12A in the disk medium 12 and the head opening 16 are provided so as to communicate with each other. In the following description, the chucking opening 42 and the head opening 16 will be also called an access opening 44. The head opening 16 is formed in an almost rectangular shape, which is long in the radial direction of the chucking opening 42, and is provided so as to link with the front side of the chucking opening 42. Therefore, the notch rim in the bottom plate 38 formed by the access opening 44 is formed in an almost U shape which opens forward. Furthermore, the head opening 16 is constructed by nothing overall height of the center portion in the lateral direction of the front portion in the outer peripheral wall 40.

The outer peripheral wall 40 constructs the peripheral wall of the case 14 when its upper end (open end) comes into contact with the lower end (open end) of the outer peripheral wall 30 of the upper shell 24. In a position corresponding to the notch 30A in the upper shell 24 in the outer peripheral wall 40, a notch 40A, which is long in the longitudinal direction and has a U-shaped rim opening upward is formed. In a state where the open ends of the outer peripheral walls 30 and 40 come into contact with each other, a shutter operation window 46 (refer to FIG. 1) is formed in the right side face of the case 14 by the notches 30A and 40A. The shutter operation window 46 is used to expose an operation projection 66 of an inner rotor 60 which will be described later.

The lower shell 26 has an inner wall 48 partially upright from the bottom plate 38 along a circumference coaxial with the chucking opening 42. The inside diameter of a virtual circle connecting the inner face of the inner wall 48 is set to be larger than the outside diameter of the inner peripheral wall 32 of the upper shell 24. In a state where the upper and lower shells 24 and 26 are joined, a gap is formed between the inner wall 48 and the inner peripheral wall 32. An annular wall 62 (which will be described later) of the inner rotor 60 is inserted in the gap. By the bottom plate 38, the inner wall 48, and the inner wall 32 of the upper shell 24, a disk housing portion 50 (refer to FIG. 1) as a portion for housing the disk medium 12 within the case 14 is formed. The disk medium 12 can be inserted/ejected to/from the disk housing portion 50 via the disk opening 20 as described above.

Further, a spindle 52 is projected from a position near the left rear corner in the bottom plate 38. The axis of the spindle 52 is positioned on the outside of the circumference along the outer face of the inner wall 48, that is, the outside of the disk housing portion 50. In the embodiment, the spindle 52 is formed in a cylindrical shape having therein a reference hole 52A, which opens in the outer face of the bottom plate 38. From a position near the right rear corner in the bottom plate 38, a projection 53 having a reference hole 53A which is paired with the reference hole 52A and is long in the lateral direction is provided. Moreover, from the outside in the radial direction of the inner wall 48 in a rear portion of the bottom plate 38, a pair of right and left bearings 54 is projected for supporting the shaft of the disk pressing member 84.

Further, a pair of recessed portions 56A and 56B are provided in the longitudinal direction in an almost center portion in the longitudinal direction near the left end of the bottom plate 38. The recessed portions 56A and 56B are disposed so as to include the start and terminating ends of a movement locus of a cam projection 72 (which will be described later) of the inner rotor 60 and so as to be apart from each other. Further, a pair of guide pins 58 is projected near the left front corner of the bottom plate 38. The pair of guide pins 58 is disposed coaxially with the inner wall 48 and on a virtual circumference having the diameter larger than the inner wall 48, and guides a disk receiving member 82 to be described later.

The lower shell 26 described above is joined to the upper shell 24 by being screwed in a state where the upper end face of the outer peripheral wall 40 is in contact with the lower end face of the outer peripheral wall 30. The upper shell 24 and the lower shell 26 may be joined to each other by, for example, joining the outer peripheral walls 30 and 44 by ultrasonic welding, adhesion, or the like in place of screwing.

Configuration of Shutter Mechanism

The shutter mechanism 18 is provided in the case 14. Concretely, the shutter mechanism 18 has the inner rotor 60 disposed in the case 14. The inner rotor 60 has the annular wall 62 formed in a short cylindrical shape. As described above, the annular wall 62 is slidably fit in the gap between the inner peripheral wall 32 of the upper shell 24 and the inner peripheral wall 48 of the lower shell 26. With the configuration, the inner rotor 60 can rotate coaxially with (the disk medium 12 housed in) the disk housing portion 50 for the case 14.

A first shutter 64 having a flat plate shape is integrally provided on the inner side of the lower end of the annular wall 62. The first shutter 64 has a shape in which a notch 65A having a shape almost similar to that of the access opening 44 and a notch 65B corresponding to a relative movement locus of an inner-radius disk receiving portion (arc rib) 80 of a second shutter 74 to be described later are provided in a circular plate having the same axis and the same diameter as those of the annular wall 62. A notch 62A having an almost U-shape which is continued from the outer end in the radial direction of the notch 65A and whose end portion opens downward is formed. The notch 62A matches a notched portion in the outer peripheral wall 40 of the lower shell 26, thereby allowing the recording/reproducing head to access from the front of the disk cartridge 10.

The first shutter 64 is slidably mounted on the bottom plate 38 of the lower shell 26 (disk housing portion 50) and, with turn of the inner rotor 60, can be in a closed position (refer to FIG. 3) where part on the outer and inner radius sides of the head opening 16 is closed and an open position (refer to FIG. 6) where the first shutter 64 is moved away from the head opening 16. That is, when the first shutter 64 positioned in the open position, the notch 65A is positioned almost just above the access opening 44.

The operation projection 66 exposed to the outside through the shutter operation window 46 of the case 14 is projected from the outer face of the annular wall 62. The operation projection 66 is disposed so as to be positioned at the front end of the shutter operation window 46 when the first shutter 64 is in the closed position and so as to be positioned at the rear end of the shutter operation window 46 when the first shutter 64 is in the open position.

From the top face of the first shutter 64, an inner-radius receiving projection 68 formed in an arc shape along the rim corresponding to the chucking opening 42 in the notch 65A is provided upright. The under face of the chucking area of the disk medium 12 comes onto contact with the top face of the inner-radius receiving projection 68. Therefore, the first shutter 64 is disposed between the bottom plate 38 and the disk medium 12 to open/close a part of the head opening 16.

On the other hand, from a portion near the outer periphery of the top face of the first shutter 64, an outer-radius receiving projection 70 is provided upright so as to extend to the inner face of the annular wall 62. The outer-radius receiving projection 70 has a height which is almost the same as that of the inner-radius receiving projection 68, and comes into contact with the area on the outside in the radial direction of the recording area in the under face of the disk medium 12. With the configuration, when the first shutter 64 is in the closed position, the inner-radius receiving projection 68 and the outer-radius receiving projection 70 support the disk medium 12 from below.

Further, a cam projection 72 is projected toward the lower shell 26 side from a portion near the outer periphery in the under face of the first shutter 64. The cam projection 72 is disposed on the outside in the radial direction of the notch 65B and always fits in a cam groove 78 (which will be described later) of the second shutter 74.

The shutter mechanism 18 also has the second shutter 74 for closing the remaining part (part on the inner radius side) of the head opening 16 when the first shutter 64 is in the closed position. The second shutter 74 is formed in a flat plate shape and slides along the bottom plate 38. Consequently, the part interfering with the movement area of the second shutter 74 in the first shutter 64, concretely, mainly the portion outside in the radial direction of the notch 65B is thinner than the other portion. That is, the second shutter 74 is thinner than the portion of closing the head opening 16 in the first shutter 64.

Figure 3:
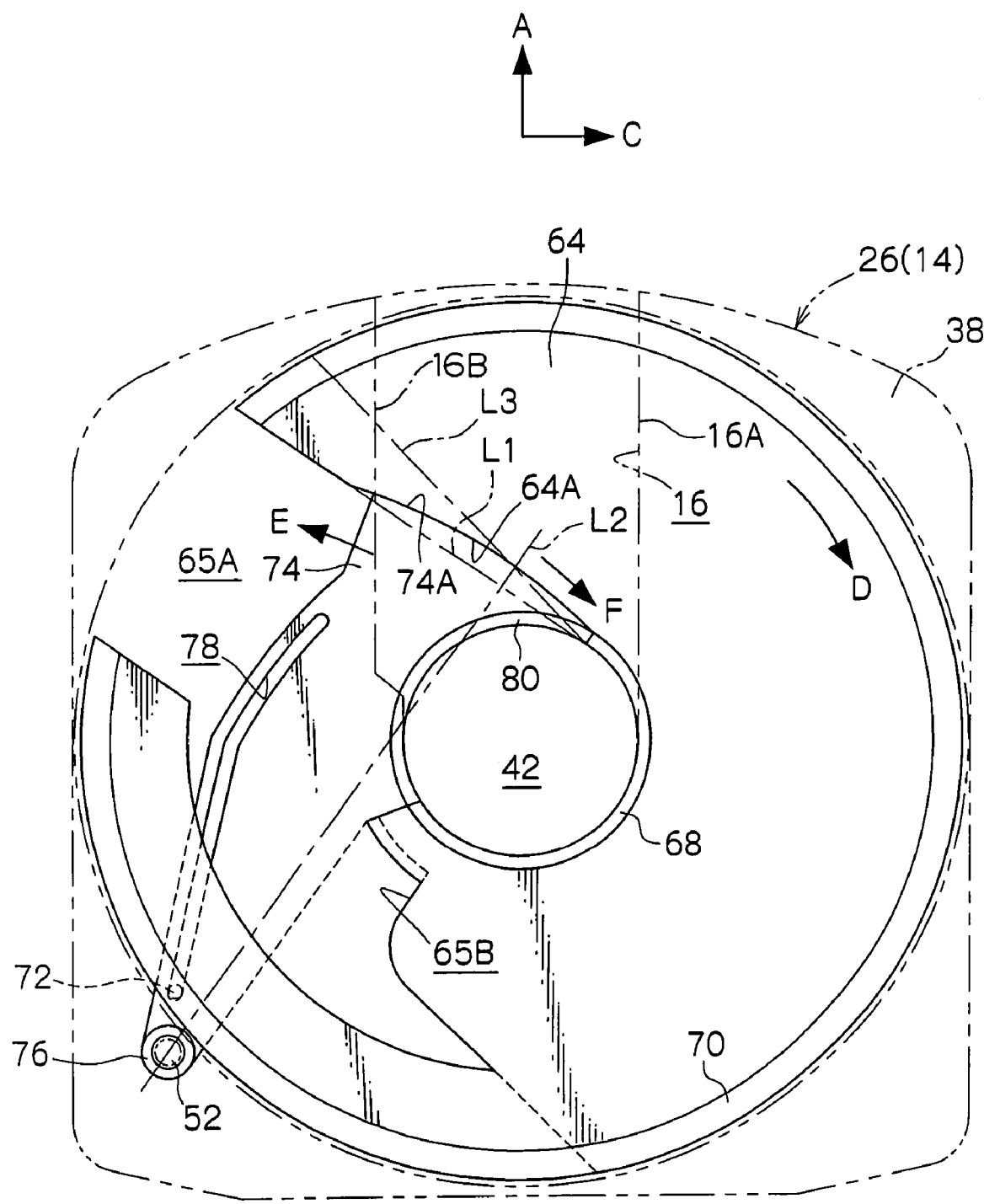
FIG. 3 is a schematic plan view showing a state where a head opening is closed by a shutter mechanism as a component of the disk cartridge according to the first embodiment of the invention.

The second shutter 74 is formed in a long plate shape and has a boss portion 76 axially rotatably supported by the spindle 52 of the lower shell 26 at one end in the longitudinal direction. Consequently, the second shutter 74 can be positioned, with turn around the spindle 52, in a closed position (refer to FIG. 3) where one part on the inner radius side of the head opening 16 is closed and an open position (refer to FIG. 6) where the second shutter 74 is moved away from the head opening 16. As shown in FIGS. 1 and 3, the first and second shutters 64 and 74 in the closed positions perfectly close the head opening 16 by making the contact end faces 64A and 74A come into contact with each other. The shape of the contact end faces 64A and 74A will be described later.

The first shutter 64 turns in the direction by the arrow D shown in FIG. 3 around the axis of the inner rotor 60, thereby moving from the closed position to the open position. The second shutter 74 turns in the direction of the arrow E almost opposite to the arrow D around the spindle 52 as a center with respect to the head opening 16, thereby moving from the closed position toward the open position. Moreover, the first shutter 64 and the second shutter 74 operate interlockingly with each other. Concretely, the cam groove 78 extending almost in the longitudinal direction is provided for the second shutter 74, and the cam projection 72 of the first shutter 64 enters the cam groove 78.

Figure 4:
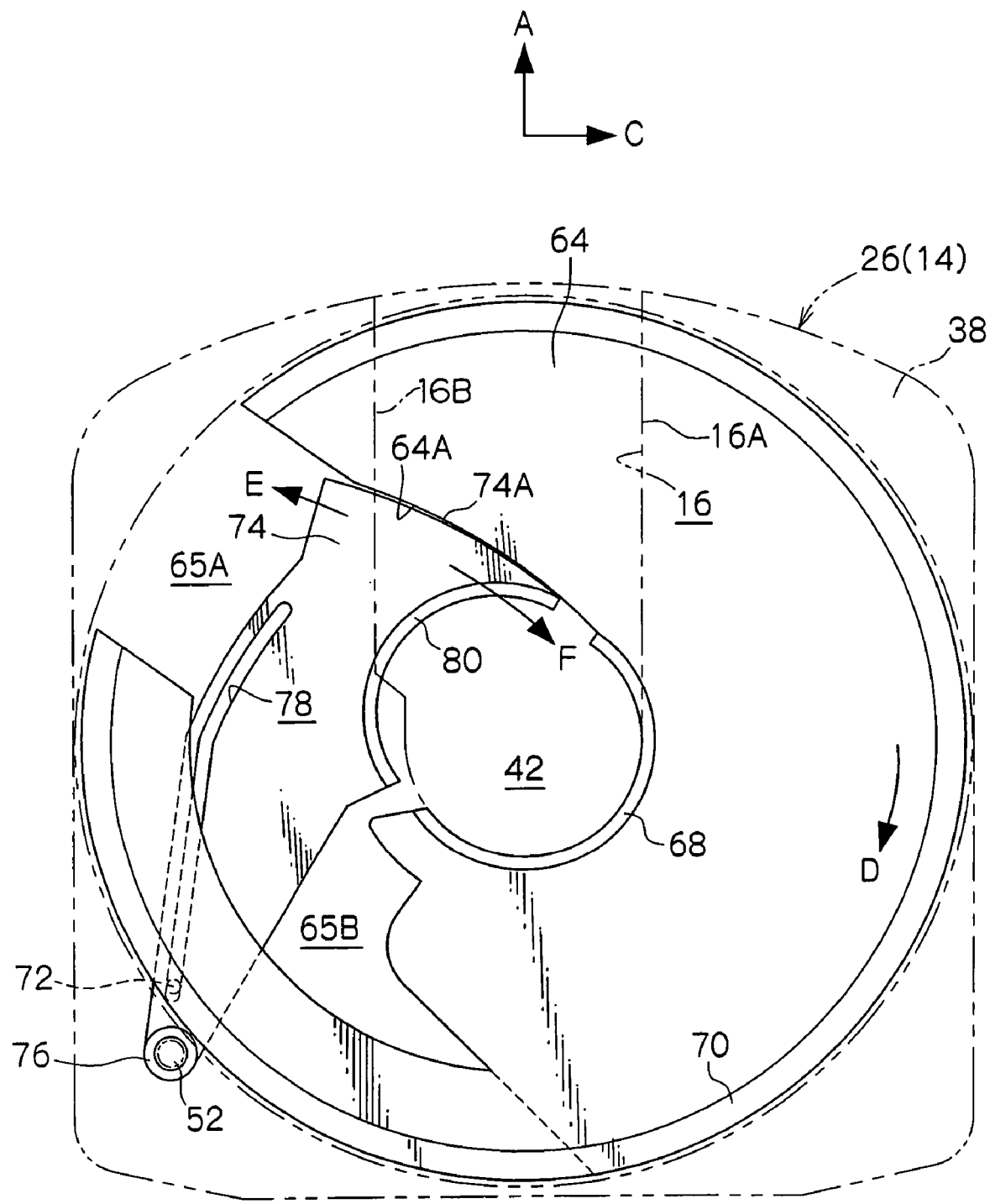
FIG. 4 is a schematic plan view showing a process of closing or opening the head opening of the shutter mechanism as a component of the disk cartridge according to the first embodiment of the invention.

With the configuration, when the operation projection 66 of the inner rotor 60 moves backward in a state where the head opening 16 is closed and the first shutter 64 turns in the direction of the arrow D, the cam projection 72 turning (revolving) in the direction of the arrow D presses the wall of the cam groove 78, thereby turning the second shutter 74 in the direction of the arrow E. In a state where the head opening 16 is closed, the cam projection 72 is positioned near the end on the spindle 52 side in the cam groove 78 and, with turn in the direction of the arrow D of the inner rotor 60 as shown in FIGS. 4 and 5, relatively moves so as to be apart from the spindle 52.

Figure 5:
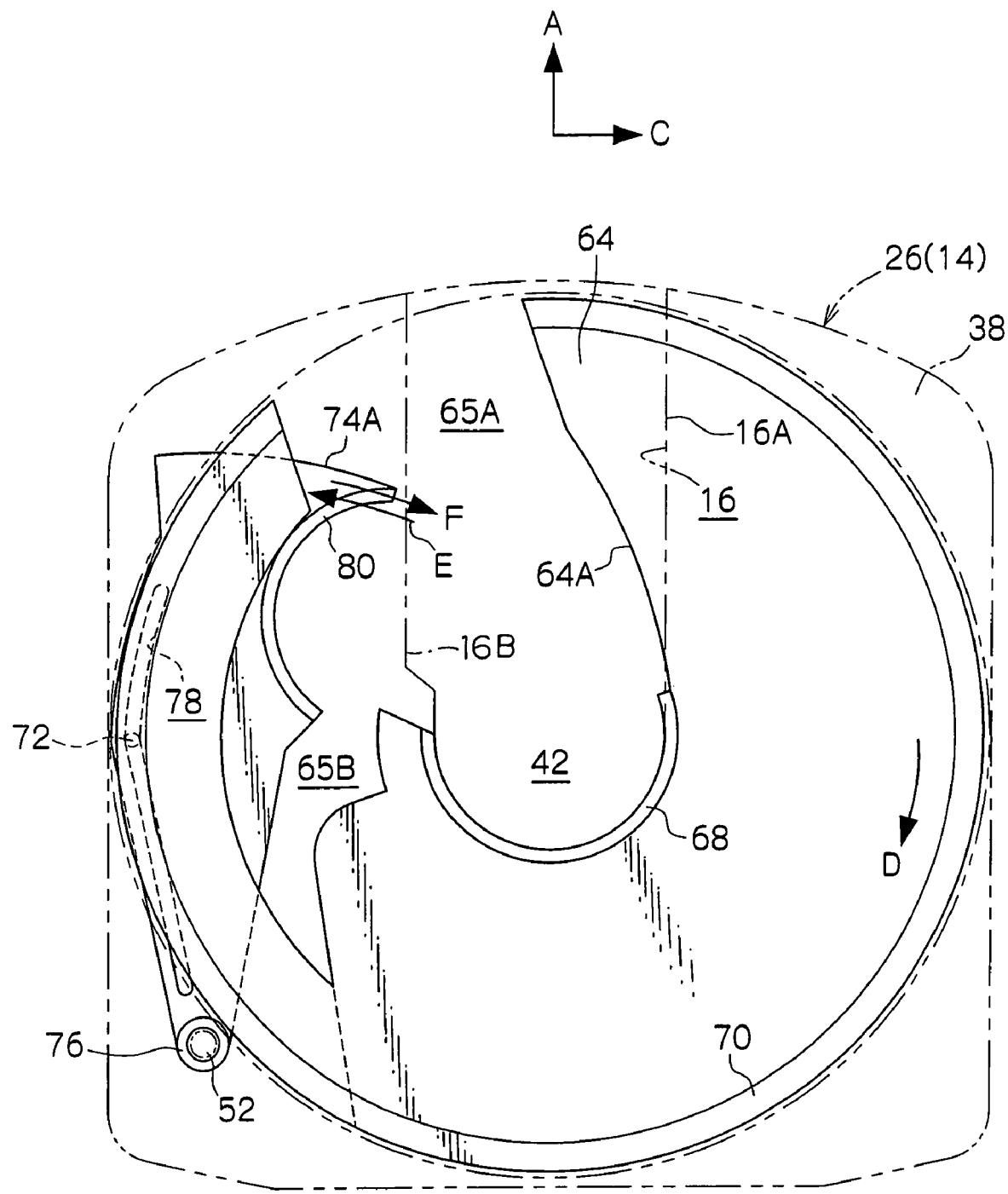
FIG. 5 is a schematic plan view showing a state different from FIG. 4 of a process of closing or opening the head opening of the shutter mechanism as a component of the disk cartridge according to the first embodiment of the invention.

In the embodiment, as shown in FIG. 5, the second shutter 74 reaches the open position faster than the first shutter 64. To cover turn in the direction of the arrow D of the first shutter while preventing the subsequent turn in the direction of the arrow E of the second shutter 74, an end on the side opposite to the side of the spindle 52 of the cam groove 78 is formed in an arc shape matching the movement locus of the cam projection 72 when the second shutter 74 is in the open position. With the configuration, the first shutter 64 moves from the turn position shown in FIG. 5 to the open position shown in FIG. 6 without interfering with the second shutter 74. In the shutter mechanism 18, by turning the inner rotor 60 in the direction opposite to the arrow D from the open state of the head opening 16, the state returns to the closed state of the head opening 16 shown in FIG. 3 via the states shown in FIGS. 5 and 4.

As shown in FIGS. 1 and 2, from the top face of the second shutter 74, the inner-radius receiving projection 80 having an arc shape which forms an annular shape in cooperation with the inner-radius receiving projection 68 of the first shutter 64 is projected in a state where the head opening 16 is closed. The outer side (inner side in the radial direction) of the inner-radius receiving projection 80 in the second shutter 74 is the notch 74B (refer to FIG. 2). Therefore, in a state where both of the first and second shutters 64 and 74 are in the closed position, the chucking opening 42 is completely opened. In other words, the chucking opening 42 is always opened and communicates with the disk opening 20.

In a state where the head opening 16 is closed, the top face of the inner-radius receiving projection 80 is almost flush with the top face of the inner-radius receiving projection 68, and the inner-radius receiving projection 80 comes into contact with part of the remaining chucking area in the under face of the disk medium 12 from below (supports the part from below). Consequently, dusts and the like do not enter the under face, that is, the recording face side of the disk medium 12 through the chucking opening 42 which is always open.

In the shutter mechanism 18, when the inner rotor 60 turns in the direction of the arrow D, the cam projection 72 fit in the recessed portion 56A in the lower shell 26 comes off from the recessed portion 56A and the first shutter 64 is lifted up and positioned upper than the second shutter 74. With the configuration, it prevents the situation that, at the initial stage of the opening operation of the head opening 16, the inner-radius receiving projection 80 of the second shutter 74 moves apart from the under face of the disk medium 12 and the inner-radius receiving projection 80 of the second shutter 74 turning in the direction of the arrow E comes into contact with the recording face of the disk medium 12. Since the notch 65B is provided in the first shutter 64, the inner-radius receiving projection 80 of the second shutter 74 does not interfere with the first shutter 64.

The cam projection 72 of the first shutter 64 moved to the open position fits in the recessed portion 56B to reset the first shutter 64 to be mounted on the bottom plate 38 and to reset the disk medium 12 to be almost parallel with the bottom plate 38. In such a manner, reliable chucking of the disk medium 12 by the rotary spindle shaft of the drive device is realized and the rotating disk medium 12 is prevented from interfering with the first shutter 64. In a process from the open state of the head opening 16 to the closed state, the operations reverse to the above are performed.

Furthermore, the shutter mechanism 18 also has the disk receiving member 82. The disk receiving member 82 has a disk outer-radius receiving part 82A which extends across ends in the circumferential direction of the notched outer-radius receiving projection 70 at the outer end in the radial direction of the notch 65A in the first shutter 74 in a state where the first and second shutters 64 and 74 close the head opening 16. Specifically, an annular shape is formed by the disk outer-radius receiving part 82A in cooperation with the outer-radius receiving projection 70 of the first shutter 64 in the closed position. In this state, the top face of the disk outer-radius receiving part 82A is almost flush with the top face of the outer-radius receiving projection 70, and the disk outer-radius receiving part 82A comes into contact with part of the remaining portion on the outside in the radial direction of the recording face in the under face of the disk medium 12 (supports the part from below). With the configuration, dusts and the like do not enter the under face, that is, the recording face, side of the disk medium 12 through the disk opening 20.

The disk receiving member 82 is supported so as to be movable in the vertical direction by a pair of guide pins 58 of the lower shell 26, and descends with the operation of the inner rotor 60 which turns in the direction of the arrow D and does not interfere with the outer-radius receiving projection 70 turning in the direction of the arrow D. Although the details will not be described, the ends in the circumferential direction corresponding to the disk outer-radius receiving part 82A and the outer-radius receiving projection 70 overlap each other in the vertical direction and are formed in a taper shape. The disk outer-radius receiving part 82A is allowed to slide below the outer-radius receiving projection 70 by the turn in the direction of the arrow D of the inner rotor 60. In the process of shift from the open state to the closed state of the head opening 16, the operations reverse to the above, are performed.

Configuration of Disk Holding Mechanism

The disk holding mechanism 22 has the disk pressing member 84. The disk pressing member 84 is constructed by a pair of spindles 84A axially turnably supported by the pair of bearings 54 of the lower shell 26 and an arm 84B which is formed integrally with the pair of spindles 84A and is long in the lateral direction. The arm 84B has a pair of right and left disk contact parts 84C, which come into contact with the top face of the disk medium 12. The disk contact part 84C can be made of rubber which is a material different from that of the spindles 84A and the arm 84B integrally formed by using a resin or the like.

The disk pressing member 84 can be selectively moved by turn around the spindle 84A among: a disk pressing position where the arm 84B extends into the disk housing portion 50 (disk opening 20) to make the disk contact parts 84C come into contact with the top face of the disk medium 12; a disk rotation permission position where the arm 84B is extended into the disk housing portion 50 and the disk contact part 84C is made apart from the top face of the disk medium 12; and a disk insertable/ejectable position where the arm 84B is moved away from the disk housing portion 50.

Moreover, as shown in FIG. 2, the disk holding mechanism 22 has a disk pressing spring 86 for energizing the disk pressing member 84 toward the disk pressing position side, and a locking member 88 which is provided so as to be slidable only in the lateral direction in the case 14 and whose operation projection 88A is exposed from the lock operation window 36. The disk pressing spring 86 is a torsion coil spring. One end of the disk pressing spring 86 is retained by the arm 84B and the other end engages with an engagement projection 88B of the locking member 88. With the configuration, the disk pressing member 84 is usually positioned in the disk pressing position by the energizing force of the disk pressing spring 86 to hold the disk medium 12.

The disk pressing member 84 is configured to move from the disk pressing position to the disk rotation permission position with the operation of opening the head opening 16 by the first shutter 64. Concretely, the annular wall 62 of the inner rotor 60 has a portion (not shown in figure) higher than the other portion, and the portion lifts the arm 84B upward in the notch 34 with turn in the direction of the arrow D of the inner rotor 60, thereby moving the disk pressing member 84 from the disk pressing position to the disk rotation permission position. In a state where the head opening 16 is open, the state where the disk pressing member 84 is in the disk rotation permission position is maintained. With the configuration, the disk pressing member 84 is prevented from interfering with the rotating disk medium 12.

Moreover, the locking member 88 engages with the other end of the disk pressing spring 86 when the operation projection 88A is positioned at the left end of the lock operation window 36 and disengages from the other end of the disk pressing spring 86 when the operation projection 88A is positioned at the right end of the lock operation window 36. Therefore, by operating the operation projection 88A to move the locking member 88 to the right, the energizing force of the disk pressing spring 86 does not affect on the disk pressing member 84. When the disk pressing member 84 is manually moved to the disk insertable/ejectable position in this state, even if the user detaches from the disk pressing member 84, the disk pressing member 84 does not return to the disk pressing position, and insertion, ejection, replacement, and the like of the disk medium 12 to/from the disk housing portion 50 can be easily performed.

Configuration of Contact Part of Shutter

As shown in FIG. 3, a contact end face 74A as an end which comes into contact with a contact end face 64A of the first shutter 64 in the second shutter 74 is formed in an arc shape in plan view. More concretely, the contact end face 74A has an arc shape having a radius of curvature whose center is the axis of the spindle 52 (boss portion 76) as an axis of turn of the second shutter 74. The contact end face 64A as the rim of the notch 65A in the first shutter 64 and an end which comes into contact with the contact end face 74A is formed in an arc shape in plan view, which matches the contact end face 74A in a state where the head opening 16 is closed.

By forming the contact end faces 64A and 74A in the arc shape as described above, the first and second shutters 64 and 74 open/close the head opening 16 smoothly and reliably while maintaining the function of closing the head opening 16 by making the contact end faces 64A and 74A come into contact with each other without a gap.

A virtual straight line L1 shown in FIG. 3 corresponds to the contact end face 64A in the case where it is assumed that the contact end face 64A almost matches a rim 16A on the right side of the head opening 16 when the first shutter 64 is in the open position. The virtual straight line L1 corresponds to a virtual straight line in the invention. A virtual straight line L2 is a normal line of the virtual straight line L1 passing the axis of the spindle 52. It is understood from the diagram that, on the side of the arrow F (the side of movement to the closed position of the second shutter 74) opposite to the arrow E side of the virtual straight line L2 in the virtual straight line L1, the angle formed by a line connecting an arbitrary point on the virtual straight line L1 and the axis of the spindle 52 and the virtual straight line L1 becomes an acute angle (less than 90°). Consequently, when the contact end faces 64A and 74A are constructed so as to match the virtual straight line L1, unless the first shutter 64 moves first in the direction of the arrow D, the second shutter 74 cannot turn in the direction of the arrow E. Similarly, in a state where the first shutter 64 is in the closed position, the second shutter 74 cannot turn from the open position to the closed position.

On the other hand, in the embodiment, the contact end faces 64A and 74A are formed in the arc shape, so that the turn in the direction of the arrow E or F of the second shutter 74 is realized without depending on the position of the first shutter 64. Therefore, it is unnecessary to form all of the range of the contact end faces 64A and 74A in the above-described arc shape but is sufficient to form at least a portion on the side of the arrow F from the virtual straight line L2 in the arc shape. The portion on the side of the arrow E of the virtual straight line L2 in the contact end faces 64A and 74A can be formed in a linear shape in which, for example, the angle formed with the virtual straight line L2 is 90° or larger. The contact end faces 64A and 74A may be formed in any shape as long as the end on the side of the arrow E in the closed state of the head opening 16 is positioned slightly on the left side of the left rim 16B of the head opening 16 and is in the case 14.

Figure 6:
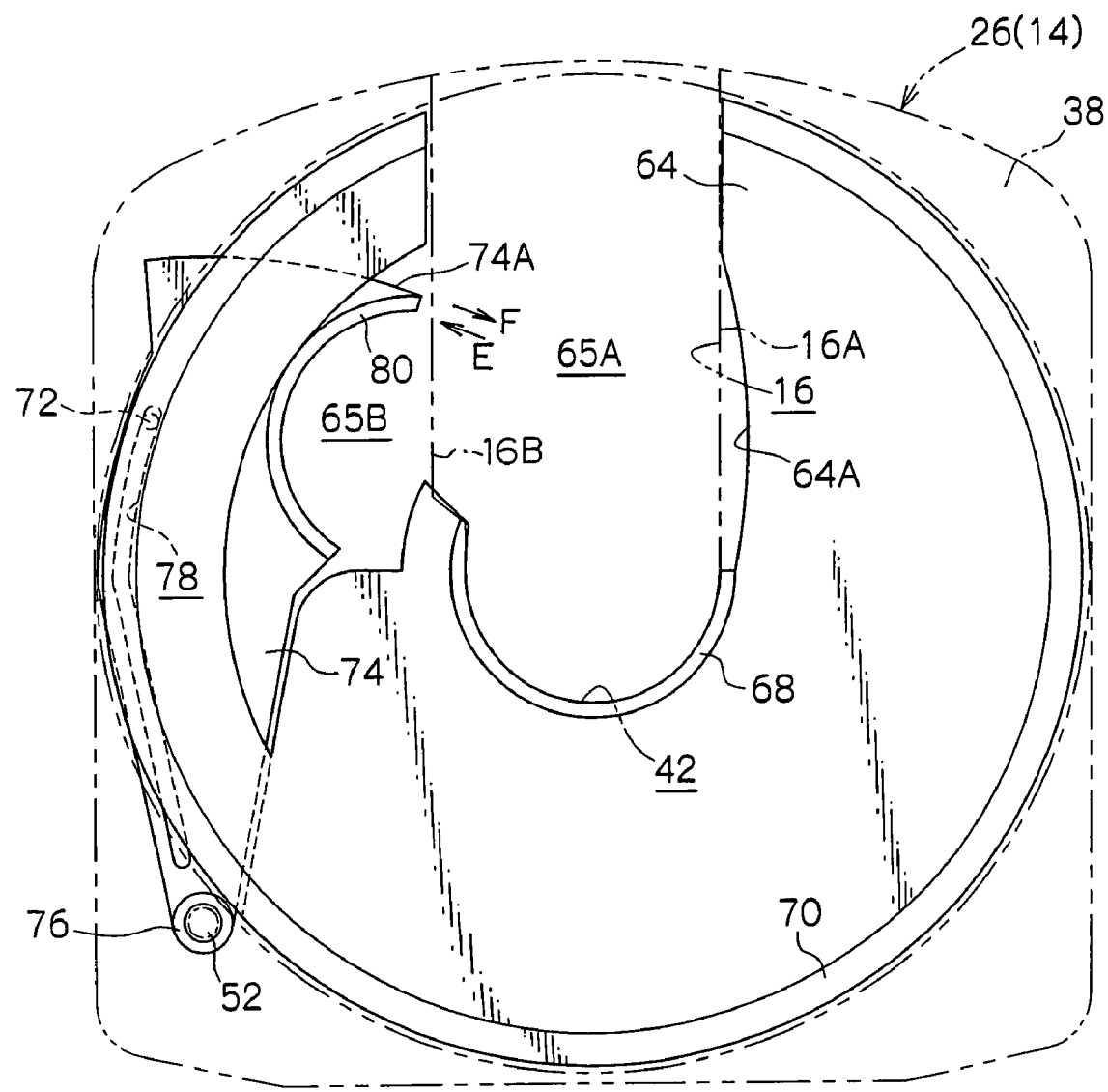
FIG. 6 is a schematic plan view showing an open state of the head opening by the shutter mechanism as a component of the disk cartridge according to the first embodiment of the invention.

With the configuration, as shown in FIG. 6, the rim (right rim of the portion corresponding to the head opening 16) on the contact end face 64A side in the notch 65A in the first shutter 64 almost matches the right rim of the head opening 16 when the first shutter 64 is in the open position except for the contact end face 64A formed in an arc shape. In a state where both of the first and second shutters 64 and 74 are in the closed position, the end face of the inner-radius receiving projection 80 comes into contact with the end face of the inner-radius receiving projection 68, thereby regulating turn of the second shutter 74 in the direction of the arrow F.

In FIGS. 3 to 6, for easier understanding, the parts (for example, the disk medium 12, disk holding mechanism 22, upper shell 24, and the like) other than the parts necessary for explanation of the operation of the first and second shutters 64 and 74 are not shown in figure.

The action of the embodiment will now be described.

In the disk cartridge 10 having the above configuration, when unused at the time of storage, carriage, or the like, the first and second shutters 64 and 74 are in the closed position to close the head opening 16. The inner-radius receiving projections 68 and 80 are formed in an annular shape and come into contact with the chucking area of the disk medium 12, thereby preventing invasion of dusts and the like from the inner radius side of the disk medium 12 to the recording face side. In addition, the outer-radius receiving projection 70 and the disk outer-radius receiving part 82A of the disk receiving member 82 are formed in an annular shape and come into contact with the portion on the outside in the radial direction of the recording face of the disk medium 12, thereby preventing invasion of dusts and the like from the outer radius side of the disk medium 12 to the recording face side. Further, the disk pressing member 84 presses the disk medium 12 downward by the energizing force of the disk pressing spring 86, thereby preventing rattle of the disk medium 12.

At the time of using the disk cartridge 10, specifically, at the time of recording information to the disk medium 12 or reproducing information recorded on the disk medium 12, the disk cartridge 10 is loaded into the drive device in the direction of the arrow A. With the loading operation (relative movement of the disk cartridge 10 and the drive device), the member of opening/closing the drive device comes into engagement with the operation projection 66 of the inner rotor 60 and moves the operation projection 66 backward.

Thereby, the inner rotor 60, that is, the first shutter 64 turns in the direction of the arrow D and, interlockingly, the second shutter 74 turns in the direction of the arrow E. When the operation projection 66 moves to the rear end of the shutter operation window 46 through the states shown in FIGS. 4 and 5, the head opening 16 enters a completely open state as shown in FIG. 6.

Subsequently, in the drive device, the disk cartridge 10 is positioned by, for example, inserting positioning pins in the reference holes 52A and 53A. In the positioned state, the rotation spindle shaft of the drive device enters from the chucking opening 42, chucks the center hole 12A (and the chucking area) of the disk medium 12 and, while holding the disk medium 12, makes the disk medium 12 apart from the top face of the first shutter 64. When the rotary spindle shaft rotates, the disk medium 12 is rotated in a non-contact manner in the case 14. On the other hand, the recording/reproduction head of the drive device enters from the head opening 16. By the recording/reproduction head, information is recorded on the recording face of the disk medium 12 or information recorded on the recording face is reproduced (the disk medium 12 is used).

After the disk medium 12 is used, the disk cartridge 10 is ejected from the drive device. With the ejecting operation, the opening/closing member of the drive device engages with the operation projection 66 of the inner rotor 60 to move the operation projection 66 forward. The inner rotor 60, that is, the first shutter 64 turns in the direction opposite to the arrow D and, interlockingly, the second shutter 74 turns in the direction of the arrow F. When the operation projection 66 moves to the front end of the shutter operation window 46 through the states shown in FIGS. 5 and 4, the head opening 16 is reset to the completely closed state as shown in FIG. 3.

Herein, since the contact end face 74A of the second shutter 74 is formed in the arc shape using the axis of the spindle 52 as a center and the contact end face 64A of the first shutter 64 is formed in the arc shape which comes into contact with the contact end face 74A almost without a gap by using the axis of the spindle 52 as a center when the contact end face 64A is in the closed position, the second shutter 74 can turn in the direction of the arrow E or F without interfering with the first shutter 64 irrespective of the turn position between the closed position and the open position of the first shutter 64.

More concretely, as shown in FIG. 3, at least the range on the side of the arrow F from the virtual straight line L2 in the contact end face 74A is formed in an arc shape using the axis of the spindle 52 as a center, so that the second shutter 74 can be reliably prevented from interfering with the first shutter 64 in the closed position. Consequently, even in the configuration that the second shutter 74 turns relatively large in the direction of the arrow E by a small turn in the direction of the arrow D of the first shutter 64 (inner rotor 60) as shown in FIG. 4, the first and second shutters 64 and 74 smoothly operate without interfering with each other and can close/open the head opening 16.

Since each of the contact end face 64A of the first shutter 64 and the contact end face 74A of the second shutter 74 is formed in the arc shape as described above, miniaturization of the second shutter 74 is realized. The virtual straight line L3 shown in FIG. 3 corresponds to the contact end faces 108A and 110A in the closed state of the conventional technique shown in FIGS. 18A and 18B. Therefore, the angle formed with a straight line connecting an arbitrary point on the virtual straight line L3 and the axis of turn of the second shutter is an obtuse angle along the whole virtual straight line L3. As understood from the diagrams, in the conventional technique, to prevent the second shutter from interfering with the first shutter, the closed range of the head opening 16 by the first shutter is narrowed as compared with the configuration in which the contact end face of the first shutter coincides with the virtual straight line L1, and the remaining range is closed by the second shutter. Consequently, the conventional second shutter whose contact end face matches the virtual straight line L3 becomes long and, moreover, the width which is important from the viewpoint of housing into the case 14 in a state where the head opening 16 is open also increases. The head opening 16 cannot be completely open with the first shutter which is parallel with the virtual straight line L3 and whose contact end face matches the virtual straight line (not shown in figure) positioned on the spindle 52 side of the virtual straight line L3.

In contrast, in the embodiment, by forming the contact end faces 64A and 74A in the arc shape, although the second shutter 74 is slightly projected from the virtual straight line L1, increase in the size is prevented. In particular, by forming the contact end faces 64A and 74A in the arc shape in overall length, both ends in the longitudinal direction of the contact end faces 64A and 74A match the ends of the virtual straight line L1, so that the size in the width direction of the second shutter 74 does not increase at all. Consequently, in the embodiment, as compared with the conventional configuration in which the contact end face matches the virtual straight line L3, the size of the second shutter 74 is drastically reduced.

Therefore, the second shutter 74 is disposed with a sufficient clearance of absorbing a processing error, an assembling error, and the like in the area on the left side of the head opening 16 as the limited space in the case 14 in the state where the head opening 16 is open as shown in FIG. 6. Moreover, by increasing the width in the lateral direction of the head opening 16, an access of a large recording head can be realized.

As described above, in the disk cartridge 10 according to the embodiment, without enlarging the second shutter 74, the head opening 16 can be smoothly closed/opened.

Moreover, in the embodiment, it has been mentioned that the configuration that each of the contact end faces 64A and 74A has the arc shape in overall length is preferable. However, the invention is not limited to the configuration. It is sufficient that at least the portion on the side of the arrow F of the virtual straight light L2 has the arc shape.

In the embodiment, the rim on the contact end face 64A side of the notch 65A in the first shutter 64 in the open position almost matches the right rim 16A of the head opening 16. However, the invention is not limited to the configuration. For example, the configuration in which the rim on the contact end face 64A side of the notch 65A in the first shutter 64 in the open position enters into the case 14 may be also employed.

Although the first shutter 64 has the notch 65A corresponding to the head opening 16 in the embodiment, the invention is not limited to the configuration but it is sufficient to form a shape such that a required part of the head opening 16 can be closed when the first shutter 64 is in the closed position (for example, in FIG. 3, an almost trapezoid shape formed by the right and left rims of the head opening 16, the outer circumference of the first shutter 64, the contact end face 64A, and the like). Therefore, the invention is not limited to the configuration that the second shutter 74 is disposed below the first shutter 64 (below a thin portion) and the thickness of the contact end face 64A and that of the contact end face 74A are different from each other. It is also possible to dispose the first and second shutters 64 and 74 along the same plane and the contact end faces 64A and 74A come into contact with each other along the overall thickness.

Further, although the configuration that the disk opening 20 is formed in the case 14 has been described in the embodiment, the invention is not limited to the configuration. For example, the top plate 28 may not have an opening. In place of the disk opening 20, the head opening 16 or access opening 44 may be provided in the top plate 28. In the latter case, the shutter mechanism 18 or another shutter mechanism may be provided between the top plate 28 and the disk medium 12.

Although the contact end face 64A of the first shutter 64 and the contact end face 74A of the second shutter 74 are simply plate thickness portions disposed in the vertical direction in the embodiment, the invention is not limited to the configuration. For example, the contact end face 64A and the second shutter 74 may be tapered faces or stepped structures overlapped with each other in the vertical direction.

Further, although the diameter of the disk medium 12 is almost 120 mm in the embodiment, the invention is not limited to the configuration. Obviously, the invention can be applied to the disk cartridge 10 having a disk medium 12 of any dimensions. For example, the disk medium 12 is not limited to a one-sided recording type but may be a double-sided recording type. Obviously, the disk medium 12 may be a reproduction-only disk medium to which information cannot be recorded by the user. Therefore, the recording/reproducing head of the above-described drive device may have only a recording function or only a reproduction function.

The disk cartridge 10 according to a second embodiment of the invention will now be described with reference to FIGS. 7 to 17F. The portions and parts common to those of the first embodiment are designated by the same reference numerals, overlapped description will be properly omitted, and characteristic parts will be described in detail.

When the first shutter 64 is in the open position, the rim 65C of the notch 65A is configured to almost match the right rim 16A of the head opening 16 in plan view.

The portion interfered with the movement area of the second shutter 74 in the first shutter 64, concretely, mainly the portion on the outside in the radial direction of the notch 65B has recessed upward with respect to the other portion (the portion is thinner than the other portion), thereby forming a shutter escape recessed portion 64A as a space in which the second shutter 74 slides by the portion and the bottom plate 38. Therefore, the second shutter 74 has a thickness corresponding to the depth of the shutter escape recessed portion 64A and is thinner than the first shutter 64.

Figure 7:
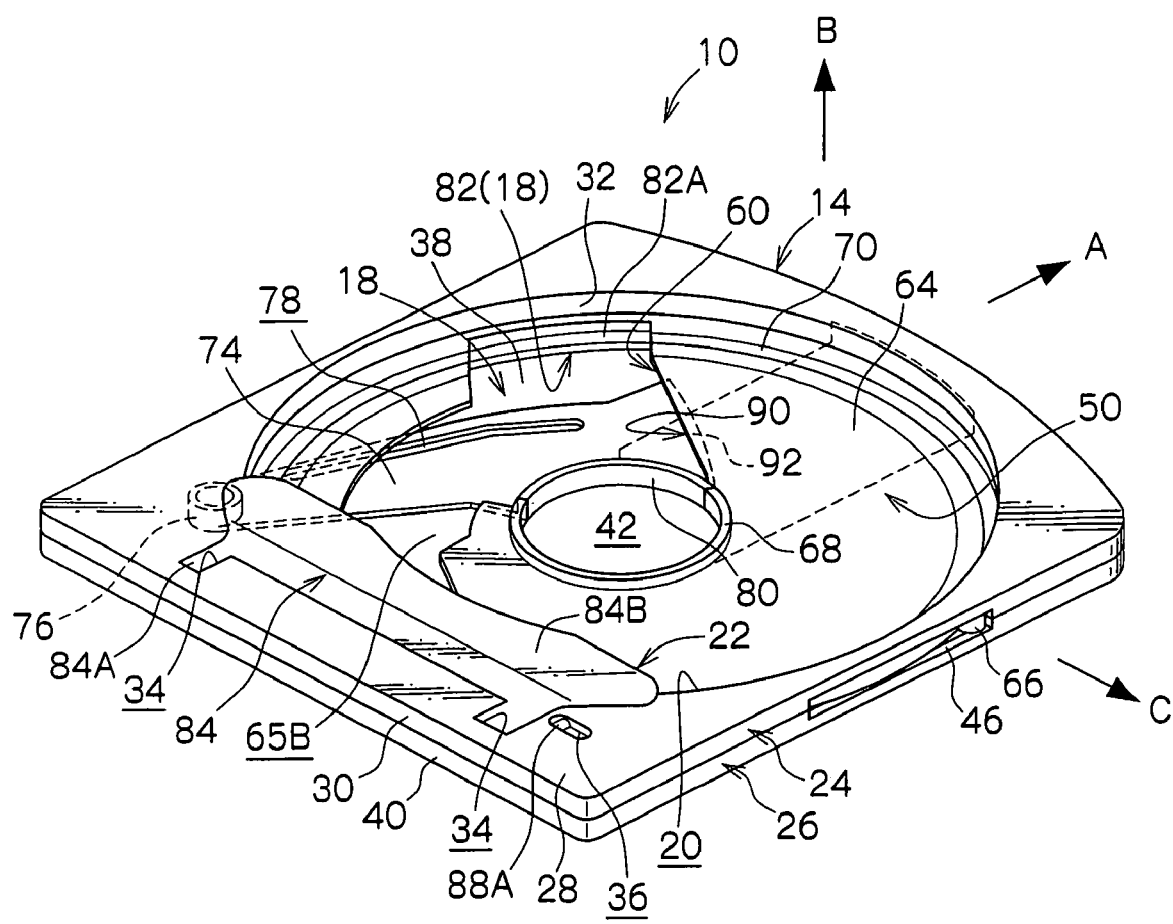
FIG. 7 is an oblique perspective view showing the appearance of a disk cartridge according to a second embodiment of the invention.
Figure 8:
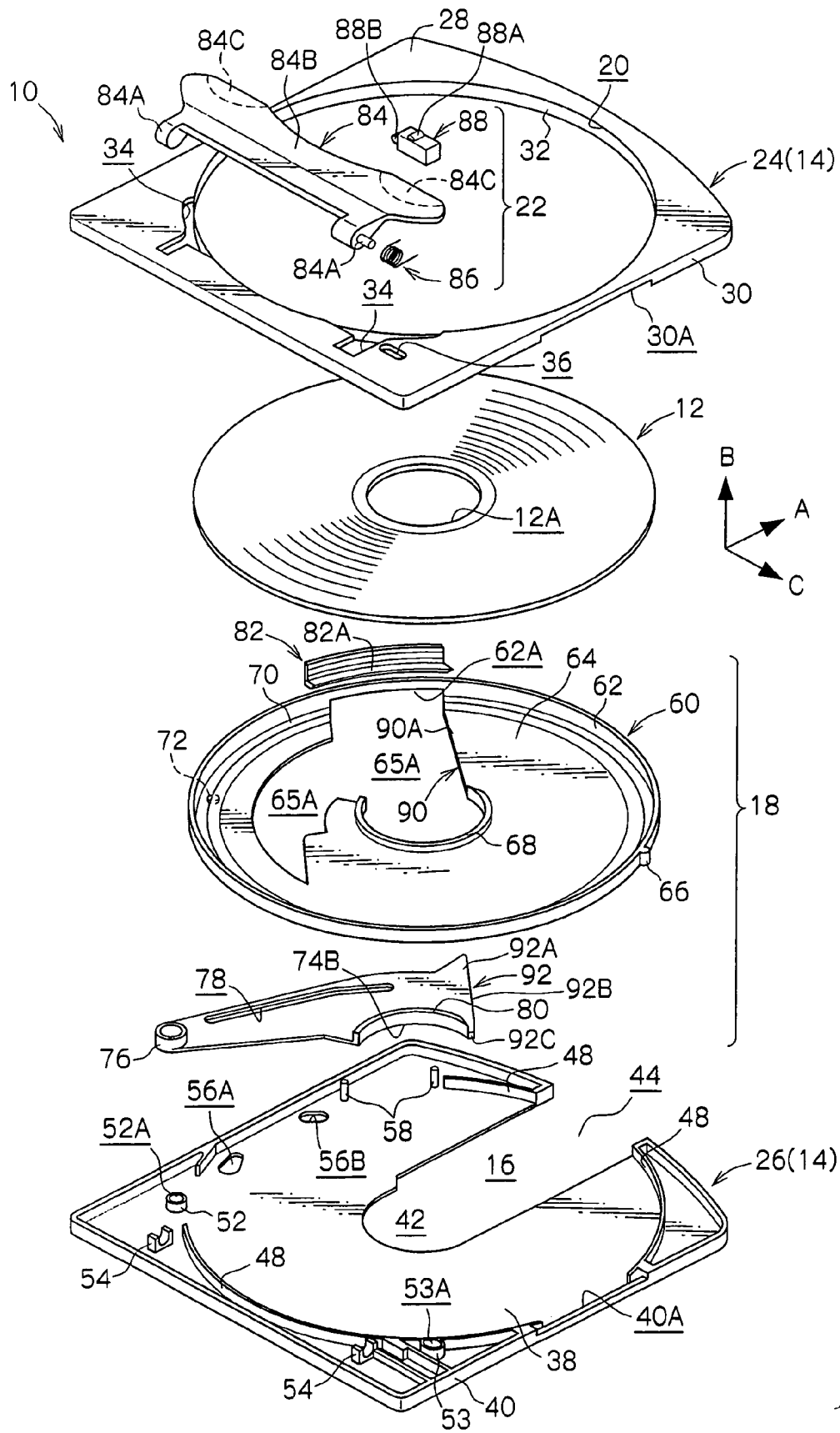
FIG. 8 is an exploded oblique perspective view of the disk cartridge according to the second embodiment of the invention.
Figure 13:
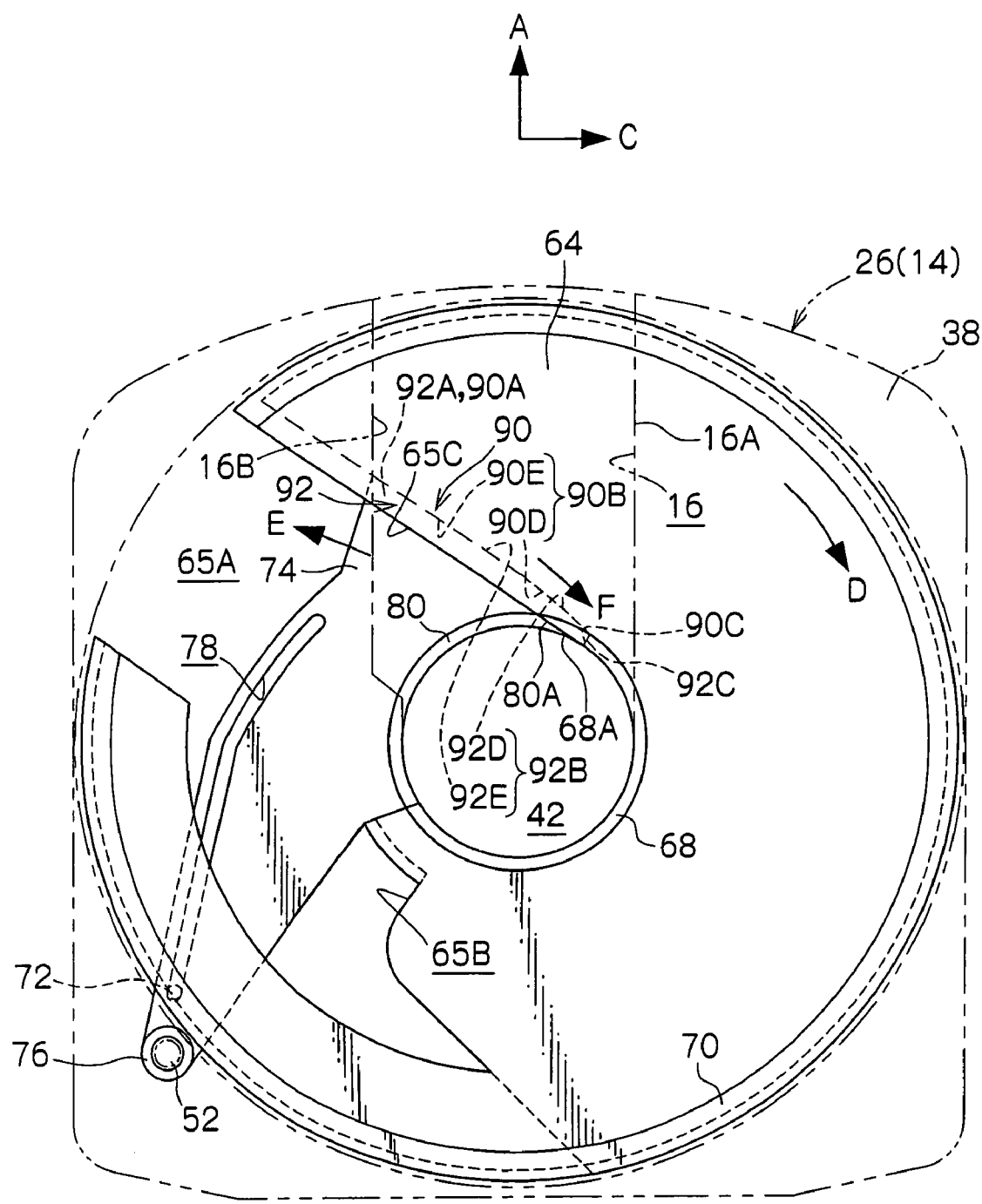
FIG. 13 is a schematic plan view showing a state where the head opening is closed by the shutter mechanism as a component of the disk cartridge according to the second embodiment of the invention.
Figure 16:
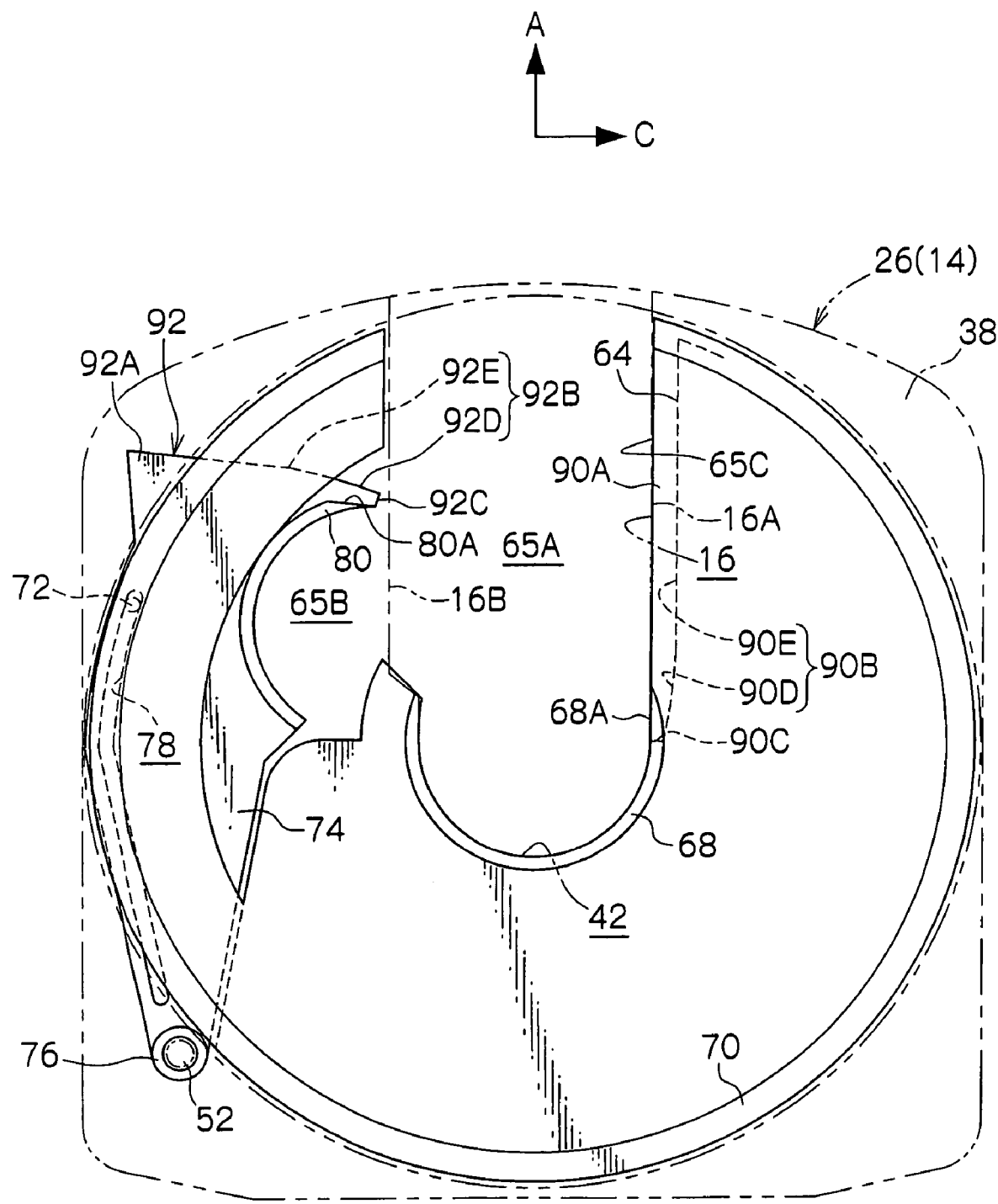
FIG. 16 is a schematic plan view showing a state where the head opening is opened by the shutter mechanism as a component of the disk cartridge according to the second embodiment of the invention.

As shown in FIGS. 7 and 13, the first and second shutters 64 and 74 in their closed positions completely close the head opening 16 by making contact ends 90 and 92 come into contact with each other. The contact mechanism of the contact ends 90 and 92 will be described later. As shown in FIG. 16, the second shutter 74 in the open position makes the contact end 92 positioned on the left side of the head opening so that the longitudinal direction of the contact end 92 crosses anteroposteriorly (of the head opening 16).

Configuration of Contact Portion of Shutter

Figure 10:
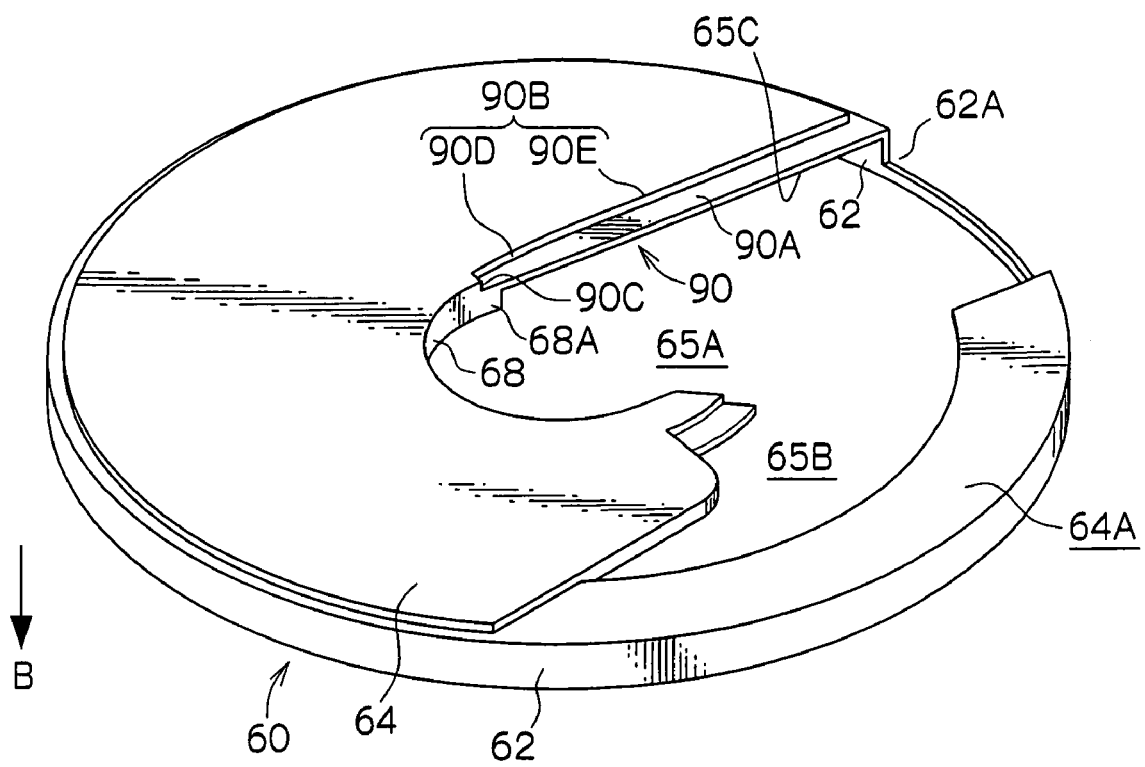
FIG. 10 is an oblique perspective view of a first shutter as a component of the disk cartridge according to the second embodiment of the invention.
Figure 11:
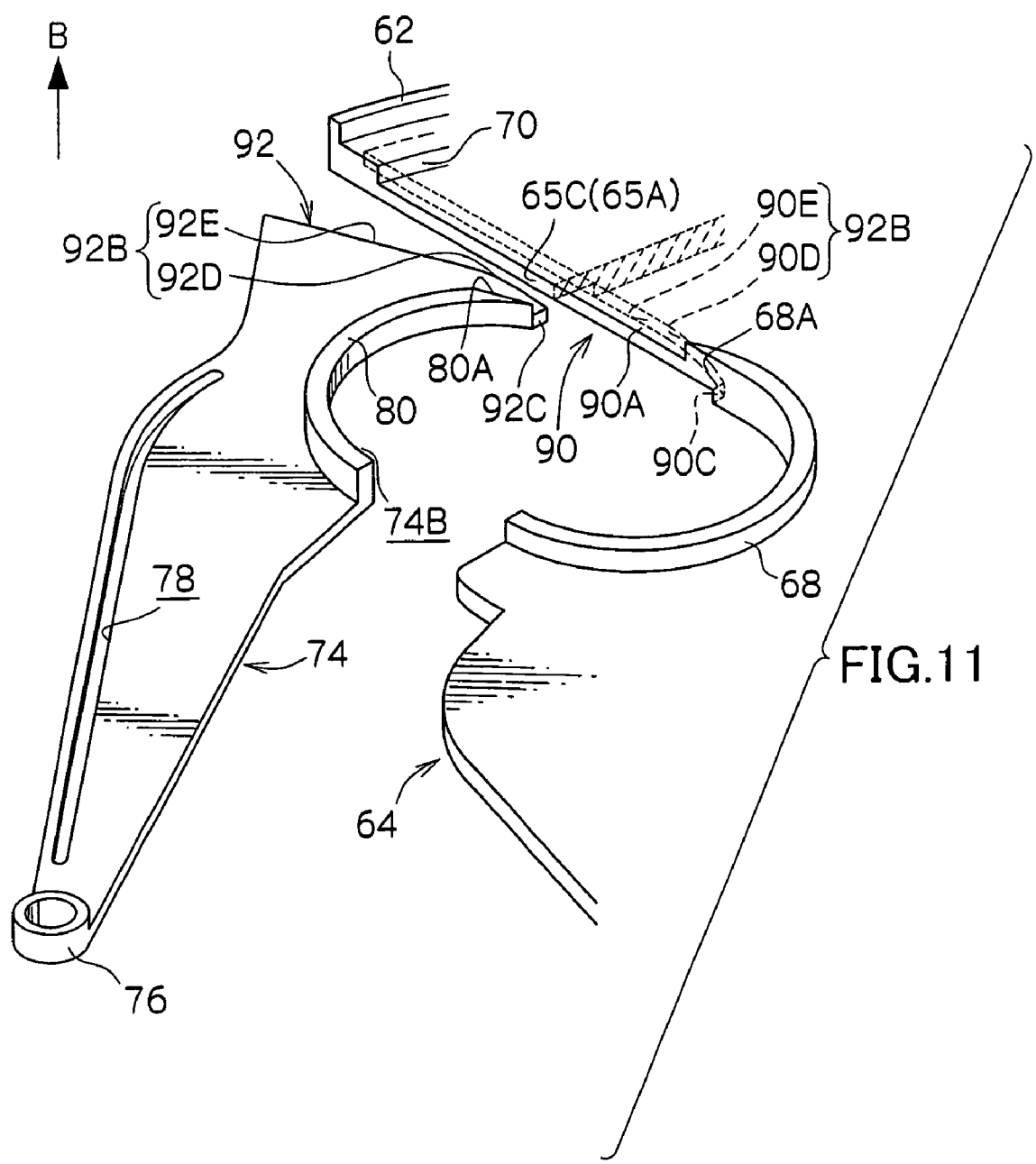
FIG. 11 is an oblique perspective view showing part of the first shutter and a second shutter as components of the disk cartridge according to the second embodiment of the invention.

As shown in FIGS. 10 and 11, the contact end 90 as an end, which comes into contact with the contact end 92 of the second shutter in the first shutter 64 has a stepped structure. When both of the first and second shutters 64 and 74 are in the closed position, the end faces (plate thickness portions) of the contact ends 90 and 92 come into contact with each other and overlap each other in the vertical direction. It will be concretely described hereinbelow.

A rim 65C corresponding to the right rim 16A of the head opening 16 in the rim of the notch 65A in the first shutter 64 is specified by a tongue portion 90A as an overlapped portion which is thinner than the other portion. As shown in FIG. 16, when the first shutter 64 is in the open position, the tongue portion 90A specifies the rim 65C almost matching the right rim 16A of the head opening 16 in plan view. The tongue portion 90A is formed in an almost elongated rectangular shape, which is long along the rim 65C. The thickness of the tongue portion 90A is equal to that of the portion where the shutter escape recessed portion 64A is formed in the first shutter 64. That is, the second shutter 74 can extend below the tongue portion 90A.

The rim along the longitudinal direction on the side opposite to the rim 65C of the notch 65A in the tongue portion 90A is specified by a stepped contact end face 90B. Specifically, the contact end face 90B specifies the border between the sliding face with the bottom plate 38 in the first shutter 64 and the tongue portion 90A, and its height corresponds to the depth of the shutter escape recessed portion 64A. Basically, the contact end face 90B is a straight line almost parallel with the rim 65C of the notch 65A in plan view, and a portion near the end on the side of the inner-radius receiving projection 68 is formed in an arc shape. The shape will be described later. The end portion on the inner-radius receiving projection 68 side in the longitudinal direction of the tongue portion 90A and the contact end face 90B is specified by a stepped portion 90C. The stepped portion 90C is positioned below the portion near the end on the edge 65C side of the inner-radius receiving projection 68, and forms an almost right angle with the contact end face 90B.

Figure 12A:
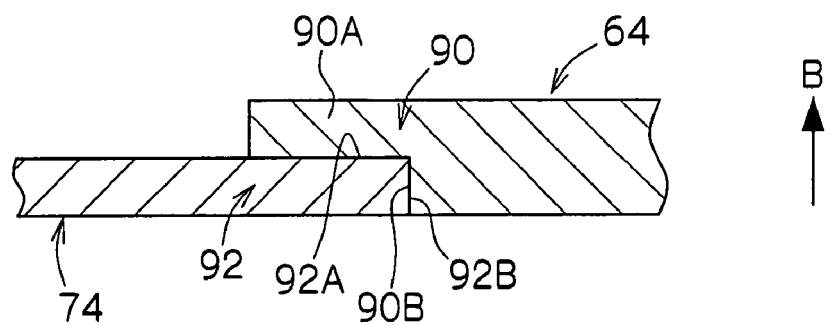
FIG. 12A is a cross sectional view taken along line 12A-12A of FIG. 9.

As shown in FIG. 11, the second shutter 74 is formed in a flat plate shape having a constant thickness corresponding to the depth of the shutter escape recessed portion 64A, that is, the height of the contact end face 90B except for the boss portion 76, inner-radius receiving projection 80, and cam groove 78. In a state where the second shutter 74 closes the head opening 16 in cooperation with the first shutter 64 as shown in FIG. 12A, the contact end 92 extends below the tongue portion 90A of the first shutter 64, and a top face 92A of the contact end 92 comes into contact with the under face of the tongue portion 90A.

Specifically, the tongue portion 90A of the first shutter 64 and the contact end of the second shutter 74 overlap each other in the thickness direction in a state where the head opening 16 is closed, particularly in the embodiment, overlapped with each other in a contact state. Therefore, the contact end 92 corresponds to an "overlap portion in the second shutter" in the invention.

Moreover, in this state, the overall length of the contact end face (plate thickness portion) 92B as the end face of the contact end 92 comes into contact with the contact end face 90B and the overall length of an end face 92C forming an angle with the contact end face 90B comes into contact with the stepped portion 90C. That is, in the first and second shutters 64 and 74, on the under face side exposed from the head opening 16, the contact end face 90B of the contact end 90 and the contact end face 92B of the contact end 92 come into contact with each other almost without any gap, and the under face of the tongue portion 90A is not seen from the outside. In this state, the tongue portion 90A which comes into contact with the top face of the contact end 92 covers the contact end 92 from above, that is, from the inside of the case 14 (the direction opposite to the arrow B).

Figure 9:
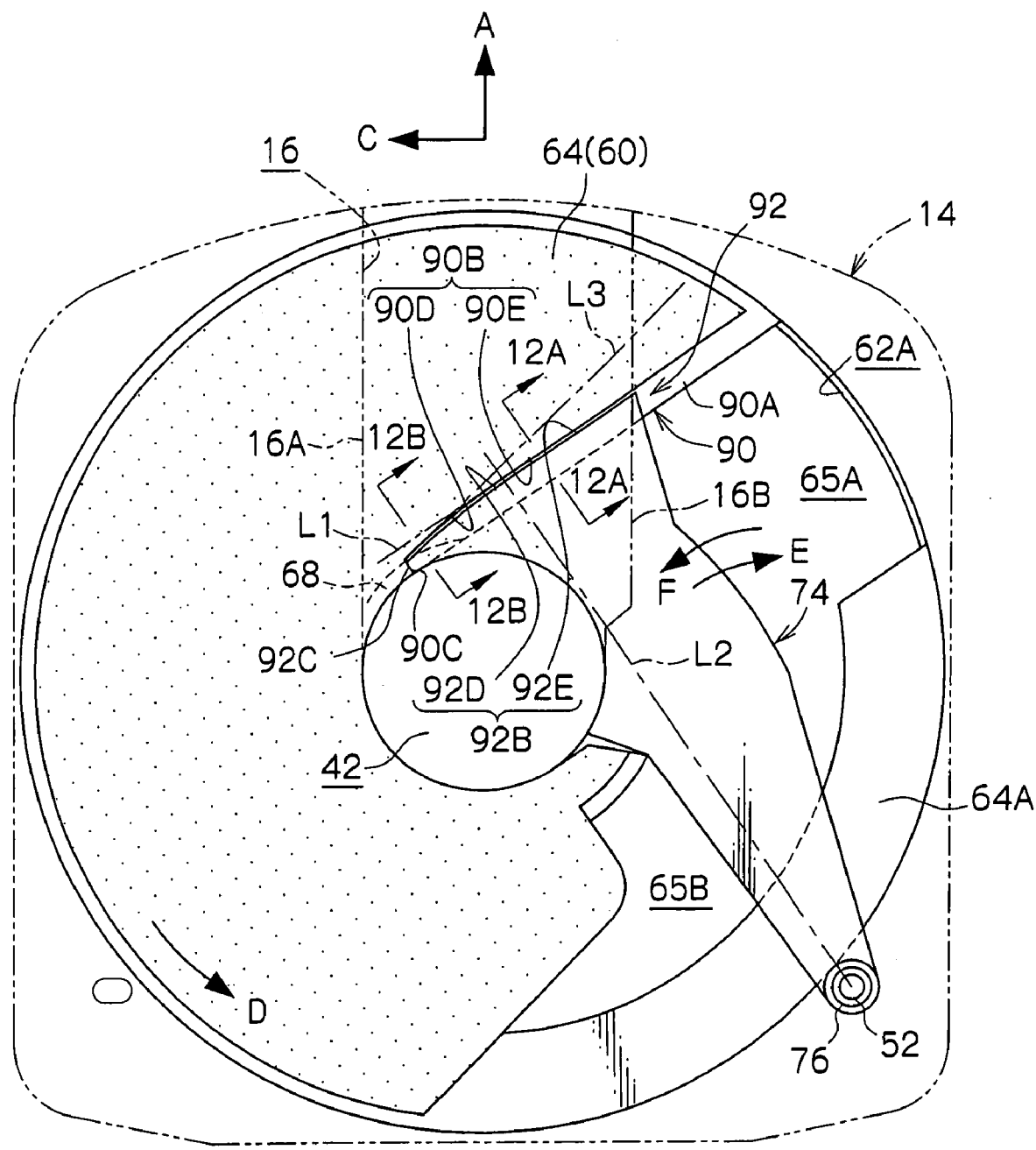
FIG. 9 is a schematic bottom view showing a state where the head opening is closed by a shutter mechanism as a component of the disk cartridge according to the second embodiment of the invention.

As shown in FIGS. 9 and 13, the shape (dimensions) of the contact end 92 of the second shutter 74 is determined so that the end on the side of the arrow E is positioned slightly to the left side of the left rim 16B of the head opening 16 in the closed position. Therefore, the portion which comes into contact with the tongue portion 90A and the contact end face 92B in the contact end face 90B (in a state where the head opening 16 is closed, mainly, the portion positioned in the head opening 16) is the contact end 90. In the first shutter 64, the tongue portion 90A (that is, the contact end face 90B) is formed along almost overall length of the rim 65C of the notch 65A so as not to obstruct operation of the second shutter 74 which turns in the direction of the arrow E shown in FIG. 9 or the direction of the arrow F which is opposite to the arrow E. Consequently, the tongue portion 90A covers the whole contact end face 92B, specifically, the whole portion exposed from the head opening 16 in the contact portion between the contact end faces 92B and 90B from the inside of the case 14 (the direction opposite to the arrow B).

A predetermined range on the side of the arrow F indicative of the direction of turn to the closed position side of the contact end face 92B of the contact end 92 is formed in an arc shape in plan view, and the remaining portion is formed in a straight line. Concretely, when it is assumed that the overall length of the contact end face 92B matches the virtual straight line L1 shown in FIG. 9, the portion on the side of the arrow F of the normal line L2 of the virtual straight line L1 passing the axis of the spindle 52 as a turn axis of the second shutter 74 is an arc portion 92D formed in an arc shape whose center coincides with the axis of the spindle 52. A portion on the side of the arrow E of the normal line L2 is a straight portion 92E. Specifically, a contact end face 92B (the tangential line of the straight portion 92E or the arc portion 92D) is set so as to form the angle of 90° or larger with a straight line connecting an arbitrary point on the contact end face 92B and the axis of the spindle 52 in plan view. The contact end face 90B of the first shutter 64 is formed in a shape having an arc portion 90D which comes into contact with the arc portion 90D of the contact end face 92B and a straight portion 90E which comes into contact with the straight portion 92E.

Consequently, the second shutter 74 can turn in the direction of the arrow E or F irrespective of the operation timings of the first shutter 64. Specifically, when there is a portion where the angle formed between the straight line connecting an arbitrary point on the contact end face 92B and the axis of the spindle 52 and the contact end face 92B is an acute angle, the second shutter 74 in the closed position cannot turn in the direction of the arrow E until the first shutter 64 moves in the direction of the arrow D. In a state where the first shutter 64 is in the closed position, the second shutter 74 cannot turn in the direction of the arrow F to return to the closed position from the open position. However, by forming the arc portions 90D and 92D, even in a state where the first shutter 64 is in the closed position, the second shutter 74 can turn in the direction of the arrow E to move the open position side or turn in the direction of the arrow F to return to the closed position.

With the configuration, in the shutter mechanism 18, the first and second shutters 64 and 74 smoothly and reliably operate without interfering with each other and the contact end 90 of the first shutter 64 and the contact end 92 of the second shutter 74 come into contact with each other to thereby reliably close the head opening 16. Moreover, in a state where the head opening 16 is closed, by making the end face 92c and the stepped portion 90C come into contact with each other, the second shutter 74 is prevented from turning in the direction of the arrow F over the closed position. The contact end face 92B of the contact end 92 and the contact end face 90B of the contact end 90 as a whole may be formed as the arc portions 92D and 90D, respectively. In this case, the tongue portion 90A is provided only in part in the longitudinal direction of the rim 65C.

As shown in FIG. 11, the second shutter 74 is notched so that the contact end 92 extends below the tongue portion 90A and the inner-radius receiving projection 80 does not exist in the top face 92A of the contact end 92. The end in the circumferential direction on the contact end 90 side of the inner-radius receiving projection 80 serves as a second joint face 80A as a flat face along the rim 65C specified by the tongue portion 90A in a state where the head opening 16 is closed.

Figure 12B:
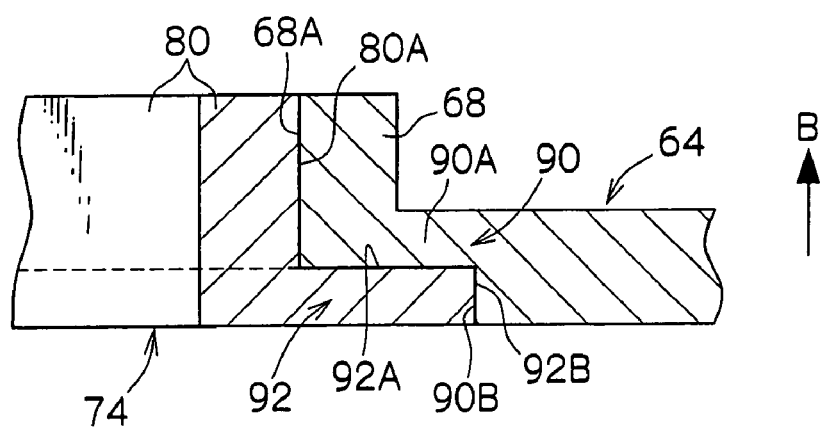
FIG. 12B is a cross sectional view taken along line 12B-12B of FIG. 9.

On the other hand, the first shutter 64 extends so that an end of the inner-radius receiving projection 68 is positioned on the tongue portion 90A. An end of the inner-radius receiving projection 68 is a first joint face 68A as a flat face extending along the rim 65C specified by the tongue portion 90A. Therefore, in a state where the head opening 16 is closed, the first joint face 68A comes into contact with the second joint face 80A of the inner-radius receiving projection 80 as shown in FIG. 12B. Specifically, in the case where the tongue portion 90A is not provided (a configuration wherein the contact end face 90B specifies the rim 65C of the notch 65A), the portion on the tongue portion 90A in the inner-radius receiving projection 68 is a portion to be provided on the top face of the second shutter 74.

Consequently, also in the configuration that the contact end 90 of the first shutter 64 and the contact end 92 of the second shutter 74 are overlapped in the vertical direction in a state where the head opening 16 is closed, the annular shape is formed by the inner-radius receiving projections 68 and 80 without a gap in the state where the head opening 16 is closed, so that the function of preventing invasion of dusts and the like to the recording face side of the disk medium 12 is maintained.

The main points of the action of the second embodiment will be briefly described below.

Figure 14:
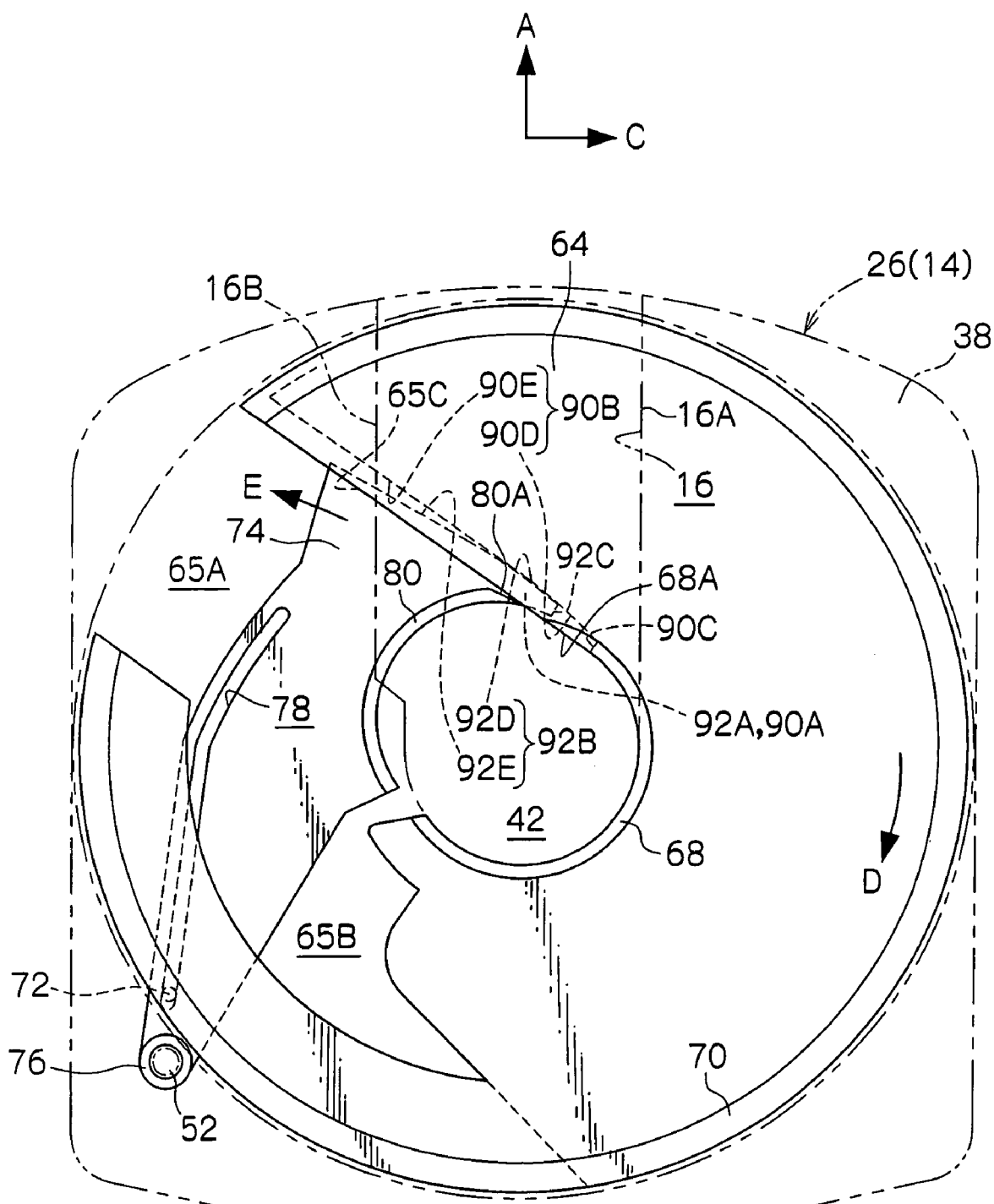
FIG. 14 is a schematic plan view showing a process of closing or opening the head opening of the shutter mechanism as a component of the disk cartridge according to the second embodiment of the invention.
Figure 15:
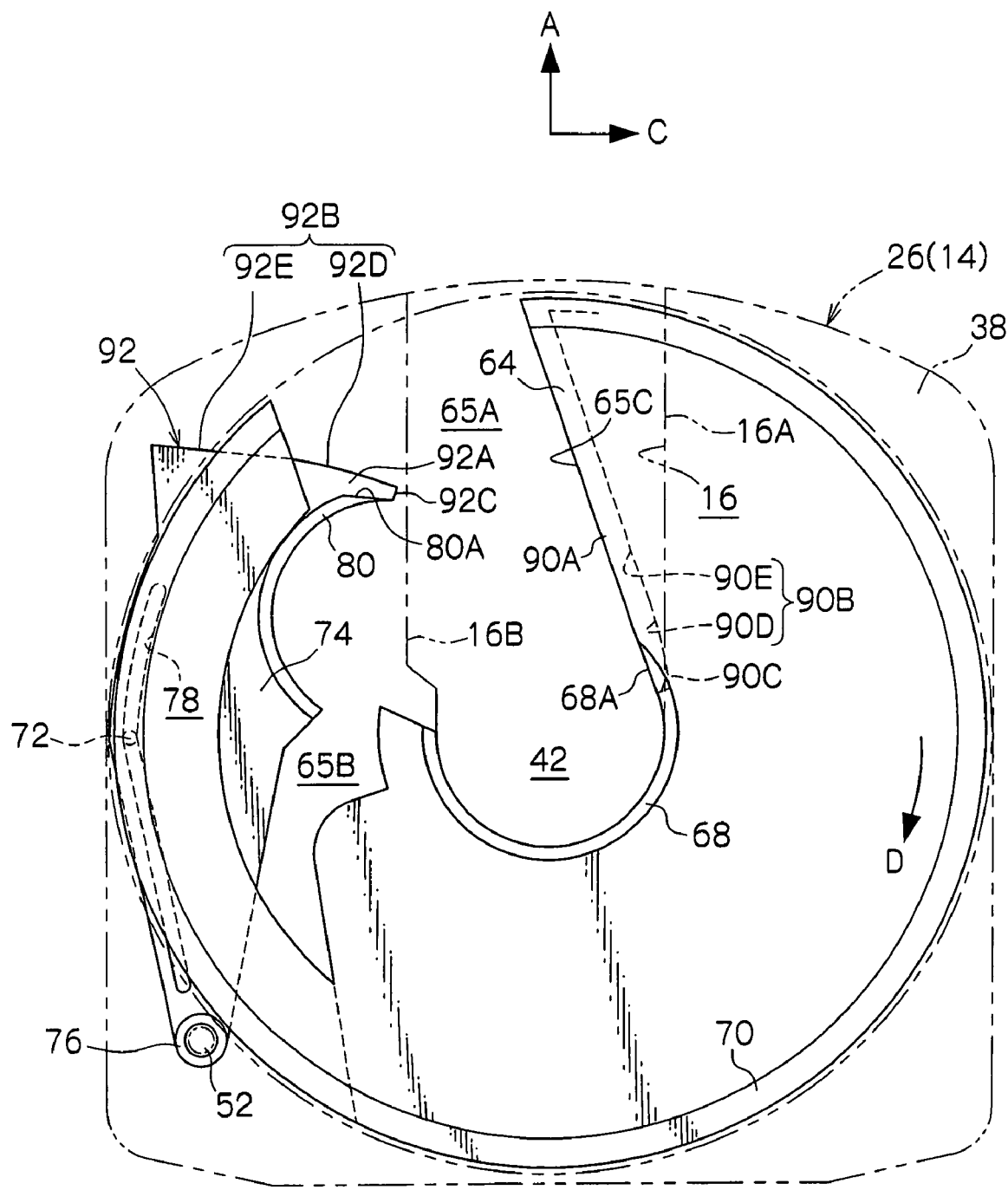
FIG. 15 is a schematic plan view showing a state different from FIG. 14 of the process of closing or opening the head opening of the shutter mechanism as a component of the disk cartridge according to the second embodiment of the invention.

Since the arc portions 90D and 92D are formed in the contact end 90 of the first shutter 64 and the contact end 92 of the second shutter 74, respectively, the second shutter 74 can turn in the direction of the arrow E or F without interfering with the first shutter 64 irrespective of the turn position between the closed position and the open position of the first shutter 64. Consequently, also in the configuration that the second shutter 74 turns relatively largely in the direction of the arrow E in association with a slight turn in the direction of the arrow D of the first shutter 64 (inner rotor 60) as shown in FIG. 14, the first and second shutters 64 and 74 smoothly operate without interfering with each other and can open/close the head opening 16. The operation timing of the second shutter can be set independently of the operation timing of the first shutter, so that the flexibility in designing improves.

In addition, the arc portions 90D and 92D are formed in the contact end 90 of the first shutter 64 and the contact end 92 of the second shutter 74, miniaturization of the second shutter 74 can be realized. Herein, the virtual straight line L3 shown in FIG. 9 corresponds to the contact end faces 108A and 110A in the conventional closed state. Therefore, the angle formed between the virtual straight line L3 and the straight line connecting an arbitrary point on the virtual straight line L3 and the axis of the second shutter is an obtuse angle along the whole virtual straight line L3. As understood from the diagram, conventionally, to prevent the second shutter from interfering with the first shutter, the closed range of the head opening 16 by the first shutter is narrowed and the remaining portion is closed by the second shutter. Consequently, the conventional second shutter whose contact end face matches the virtual straight line L3 becomes long and, moreover, the width which is important from the viewpoint of housing into the case 14 in a state where the head opening 16 is open also increases. Moreover, the head opening 16 cannot be completely open with the first shutter whose contact end face is parallel with the virtual straight line L3 and matches an virtual straight line (not shown in figure) positioned on the spindle 52 side of the virtual straight line L3.

In contrast, in the embodiment, by providing the arc portions 90D and 92D in the contact ends 90 and 92, respectively, although the second shutter 74 is slightly projected with respect to the rim 65C of the first shutter 64 which is parallel with the virtual straight line L1, increase in the size, particularly, increase in the width is prevented. Therefore, the second shutter 74 is disposed with a sufficient clearance of absorbing a processing error, an assembling error, and the like in the area on the left side of the head opening 16 as the limited space in the case 14 in the state where the head opening 16 is open as shown in FIGS. 12A and 12B. Moreover, by increasing the width in the horizontal direction of the head opening 16, an access of a large recording head can be also realized.

In the second shutter 74, the contact end 92 which is projected from the rim 65C overlaps the tongue portion 90A of the first shutter 64 in the vertical direction in a state where the head opening 16 is closed, while preventing the size of the second shutter 74 from increasing and maintaining the function of reliably opening the head opening 16, the function of preventing dusts and the like from entering the case 14 in a state where the head opening is closed is realized.

Concretely, in a state where the head opening 16 is closed, the tongue portion 90A and the contact end 92 overlap each other. In other words, the whole contact portions of the contact end face 90B and 92B are covered with the tongue portion 90A. Therefore, even if a gap is created between the contact end faces 90B and 92B, the tongue portion 90A prevents invasion of dusts into the case 14. To be specific, the tongue portion 90A and the contact end 92 form a spigot joint structure or a maze structure of the gap to prevent invasion of dusts. In particular, the tongue portion 90A is configured to come into contact with the top face 92A of the contact end 92, so that invasion of dusts into the case 14 is reliably checked. Moreover, since the contact face between the tongue portion 90A and the top face 92A of the contact end 92 is almost parallel with the turn face (face orthogonal to the axis of turn) of the first and second shutters 64 and 74, even if a gap (gap within the range of the overlap portion between the tongue portion 90A and the contact end 92) is created between the contact end faces 90B and 92B, no gap is created between the tongue portion 90A and the contact end 92 and invasion of dusts into the case 14 is checked more reliably.

Since the tongue portion 90A covering the contact portion between the contact end faces 90B and 92B in a state where the head opening 16 is closed is positioned on the inner side of the case 14 (on the side of the disk medium 12), in other words, since the tongue portion 90A is not exposed to the outside of the case 14, the tongue portion 90A does not deteriorate the appearance of the disk cartridge 10 when unused, and an erroneous operation or the like of the tongue portion 90A by the user is also prevented.

Further, in the disk cartridge 10, the inner-radius receiving projection 80 is not positioned in the top face 92A of the contact end 92 of the second shutter 74, the inner-radius receiving projection 68 extends on the tongue portion 90A of the first shutter 64, and the first joint faces 68A and 80A of the inner-radius receiving projections 68 and 80 come into contact with each other in a state where the head opening 16 is closed. Thus, the inner-radius receiving projections 68 and 80 do not interfere with the opening/closing operation of the head opening 16. Since the inner-radius receiving projections 68 and 80 come into contact with each other without any gap in a state where the head opening 16 is closed, also in the case of employing the configuration of overlapping the first and second shutters 64 and 74 in the configuration where the chucking opening 42 is not closed, the function of preventing invasion of dusts to the recording face side of the disk medium 12 is maintained.

As described above, in the disk cartridge 10 according to the embodiment, the head opening 16 can be reliably opened/closed and the dustproof performance in a state where the head opening 16 is closed improves.

Figure 17A:
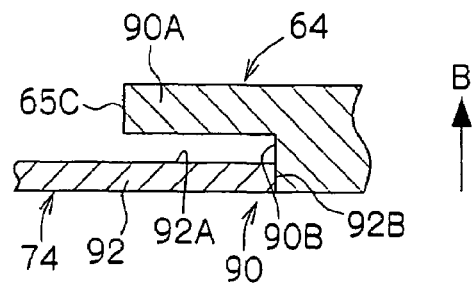
FIGS. 17A to 17F are respectively cross sectional views corresponding to FIG. 12A showing modifications of a structure of contact between the first and second shutters as components of the disk cartridge according to the second embodiment of the invention.
Figure 17B:
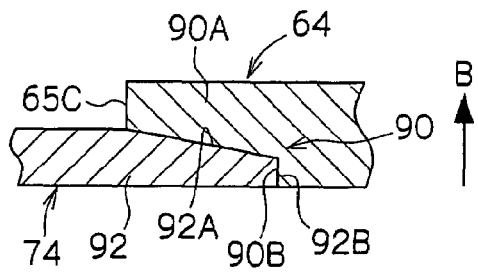

The invention is not limited to the structure of contact of the contact ends 90 and 92 in the foregoing embodiment but can be variously modified as shown in, for example, FIGS. 17A and 17B.

Figure 17C:
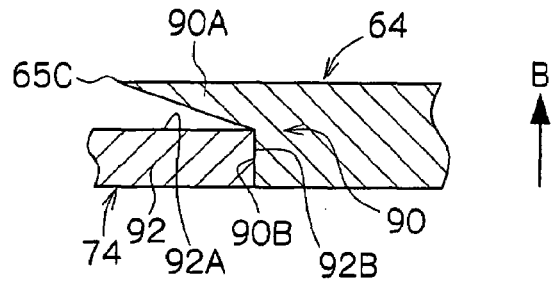
Figure 17D:
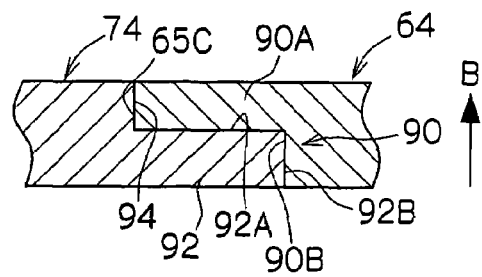
Figure 17E:
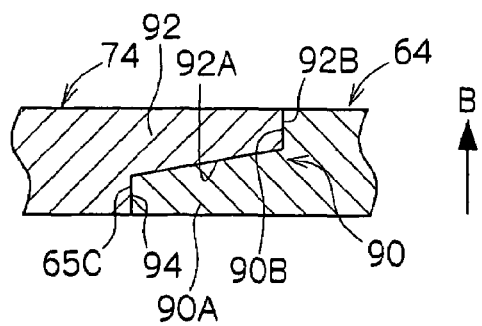
Figure 17F:
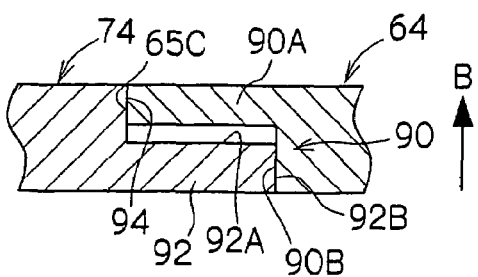

Specifically, the configuration in which the tongue portion 90A shown in FIG. 17A does not come into contact with the top face 92A of the contact end 92 may be also employed. The tongue portion 90A and the top face 92A may be formed in taper shapes, which guide each other as shown in FIG. 17B. Alternately, only the tongue portion 90A may be formed in a tapered shape as shown in FIG. 17C. Further, as shown in FIG. 17D, the second shutter 74 may be formed in a stepped structure having a contact end face 94 which comes into contact with the rim 65C of the first shutter 64 (end face of the tongue portion 90A). In the configuration where the second shutter 74 has the contact end face 94, as shown in FIG. 17E, the tongue portion 90A may be disposed on the outside of the case and may come into contact with the under face 92A of the contact end 92. As shown in FIG. 17F, a configuration that the tongue portion 90A does not come into contact with the top face 92A of the contact end 92 may be also employed. A portion corresponding to the arc portion 92D in the longitudinal direction of the contact end face 94 is formed in an arc shape (not shown in figure) like the contact end face 92B.

Although not shown in figure, the contact end 90 of the first shutter 64 may be formed in a stepped structure having three or more steps. In this case, it is desirable to set the end face on the outermost side (lowest) of the case 14 as an end, which comes into contact with the contact end face 92B. Similarly, the contact end 92 of the second shutter 74 may be formed in a stepped structure having three or more steps. In the case where both of the first and second shutters 64 and 74 have the stepped structure, desirably, the end faces positioned outermost sides (lowest) of the case 14 come into contact with each other. Moreover, the contact end faces 90B and 92B may be formed in tapered shapes, which correspond to with each other.

Although the first shutter 64 has the notch 65A corresponding to the head opening 16 in the embodiment, the invention is not limited to the embodiment but it is sufficient to obtain a shape which can close required part of the head opening 16 when the first shutter 64 is in the closed position (for example, in FIG. 13, an almost trapezoid shape surrounded by the right and left rims of the head opening 16, the outer periphery of the first shutter 64, the contact end 90, and the like). Therefore, the invention is not limited to the configuration where the second shutter 74 is disposed below the first shutter 64 (below the thin portion), that is, the configuration is not limited in which the thickness of the first shutter 64 and that of the second shutter 74 are different from each other. The configurations of FIGS. 17D, 17E, and 17F can be realized by the configuration where the first and second shutters 64 and 74 have the same thickness.

Further, although the configuration in which the disk opening 20 is provided in the case 14 has been described in the embodiment, the invention is not limited to the configuration. For example, a configuration that the top plate 28 does not have an opening or a configuration that the head opening 16 or access opening 44 is provided for the top plate 28 in place of the disk opening 20 may be employed. In the latter case, the shutter mechanism 18 or another shutter mechanism can be provided between the top plate 28 and the disk medium 12.

Furthermore, in the embodiment, the configuration that the diameter of the disk medium 12 is almost 120 mm has been described. However, the invention is not limited to the configuration. Obviously, the invention can be also applied to the disk cartridge 10 having the disk medium 12 of any dimension. Moreover, for example, the disk medium 12 is not limited to a one-sided recording type but may be a double-sided recording type. Obviously, the disk medium 12 may be a reproduction-only disk medium to which information cannot be recorded by the user. Therefore, the recording/reproducing head of the above-described drive device may have only a recording function or only a reproduction function.

What is claimed is:

1. A disk cartridge comprising:
   a case having a housing portion for housing a disk medium formed in a disc shape so as to be rotatable, and a head opening which is provided on a recording face side of the disk medium in said housing portion and through which a head of a drive device accesses the recording face; and
   a shutter mechanism having a first shutter rotatably provided at the case so as to be coaxial with the disk medium and a second shutter swingable around an axis different from that of the first shutter, closing the head opening by contact ends of the first and second shutters coming into contact with each other, and opening the head opening by the first and second shutters rotating in directions opposite to each other with respect to the head opening,
   wherein the contact end of the first shutter includes a first arc portion and the contact end of the second shutter includes a second arc portion and wherein in a state where the head opening is closed a radius of curvature of the first arc portion and a radius of curvature of the second arc portion are coincident with each other.

2. The disk cartridge of claim 1, wherein in the contact ends of the first and second shutters, when it is assumed that the contact ends of the first and second shutters are a virtual straight line, a range in which the angle formed between the virtual straight line and a straight line connecting the virtual straight line and the axis of rotation of the second shutter is an acute angle is formed in an arc shape having the axis of rotation of the second shutter as a center.

3. The disk cartridge of claim 1, wherein in the contact ends of the first and second shutters, when it is assumed that the contact end of the first shutter is a virtual straight line extending along a rim of the head opening in a state where the head opening is open, a range in which the angle formed between the virtual straight line and a straight line connecting the virtual straight line and the axis of rotation of the second shutter is an acute angle is formed in an arc shape having the axis of rotation of the second shutter as a center.

4. The disk cartridge of claim 1, wherein the contact ends along the entire length of the first and second shutters are formed in an arc shape having the axis of rotation of the second shutter as a center.

5. The disk cartridge of claim 1, wherein an entire border of the first arc portion and an entire border of the second arc portion are in contact with each other.

6. The disk cartridge of claim 1, wherein the first arc portion of the first shutter has a radius of curvature whose center is a rotational axis of the second shutter and the second arc portion of the second shutter has a radius of curvature whose center is also the rotational axis of the second shutter.

7. The disk cartridge of claim 1, wherein the second arc portion of the second shutter has a radius of curvature whose center is a rotational axis of the second shutter in a state where the head opening is opened.

8. The disk cartridge of claim 1, wherein the first arc portion of the first shutter is different from an arc shape corresponding to a inner radius of a chucking opening.

9. The disk cartridge of claim 1, wherein the second arc portion of the second shutter is different from an arc shape corresponding to a inner radius of a chucking opening.

10. The disk cartridge of claim 1, wherein a boundary is shared along the entire length of the first arc portion and the second arc portion.

11. A disk cartridge comprising:
    a case having a housing portion for housing a disk medium formed in a disc shape so as to be rotatable, and a head opening which is provided on a recording face side of the disk medium in said housing portion and through which a head of a drive device accesses the recording face; and
    a shutter mechanism having a first shutter rotatably provided at the case so as to be coaxial with the disk medium and a second shutter swingable around an axis different from that of the first shutter, closing the head opening by contact ends of the first and second shutters coming into contact with each other, and opening the head opening by the first and second shutters rotating in directions opposite to each other with respect to the head opening,
    wherein the contact ends of the first and second shutters have contact end faces which come into contact with each other in a state where the head opening is closed, and overlap portions which overlap each other in the thickness direction in a state where the head opening is closed, and wherein at least one part in the longitudinal direction of the contact end face of the first shutter is formed a first arc portion and the contact end face of the second shutter is formed a second arc portion both the first and second arc portions having a radius of curvature and the axis of rotation of the second shutter as a center in a state where the head opening is closed so as to allow swinging of the second shutter in a state where the first shutter is in the position of closing the head opening.

12. The disk cartridge of claim 11, wherein the first and second shutters overlap each other so that said overlap portions are in contact with each other in the state where the head opening is closed.

13. The disk cartridge of claim 11, further comprising a pair of projections each formed in an arc shape, one of which being provided at the first shutter, the other being provided at the second shutter, forming an annular shape by end faces in the circumferential direction coming into contact with each other in a state where the head opening is closed, and coming into contact with a face around a center hole provided at an axial center portion of the disk medium.

14. The disk cartridge of claim 13, wherein the overlap portion of the first shutter mutually overlaps with the overlap portion of the second shutter so as to be on the disk medium side with respect to the overlap portion of the second shutter.

15. The disk cartridge of claim 14, wherein an end in the circumferential direction of the projection at the first shutter serves as a first joint face which extends along a rim of the overlap portion of the first shutter.

16. The disk cartridge of claim 15, wherein an end in the circumferential direction of the projection of the second shutter serves as a second joint face which extends to a border between the overlap portion of the second shutter and the other portion thereof and comes into contact with said first joint face in a state where the head opening is closed.

* * * * *